(12) United States Patent
Oike et al.

(10) Patent No.: US 7,637,673 B2
(45) Date of Patent: *Dec. 29, 2009

(54) OPTICAL CONNECTOR AND OPTICAL FIBER CONNECTING SYSTEM

(75) Inventors: Tomayasu Oike, Tokyo (JP); Takaya Yamauchi, Tokyo (JP); Akihiko Yazaki, Tokyo (JP); Tsunetaka Ema, Tokyo (JP); Kenichi Nakazawa, Tokyo (JP); Yasuhiko Hoshino, Tokyo (JP)

(73) Assignees: 3M Innovative Properties Company, St. Paul, MN (US); Nippon Telegraph and Telephone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/572,111

(22) PCT Filed: Jun. 23, 2005

(86) PCT No.: PCT/US2005/022401
§ 371 (c)(1),
(2), (4) Date: Jul. 23, 2008

(87) PCT Pub. No.: WO2006/019516
PCT Pub. Date: Feb. 23, 2006

(65) Prior Publication Data
US 2008/0304795 A1 Dec. 11, 2008

(30) Foreign Application Priority Data
Jul. 16, 2004 (JP) .............................. 2004-210251

(51) Int. Cl.
*G02B 6/255* (2006.01)
*G02B 6/00* (2006.01)
(52) U.S. Cl. .............................. 385/98; 385/95; 385/137
(58) Field of Classification Search .................... 385/98
See application file for complete search history.

(56) References Cited

U.S. PATENT DOCUMENTS 3,871,744 A * 3/1975 Bridger et al. ................ 385/84

(Continued)

FOREIGN PATENT DOCUMENTS

EP 0 486 064 A2 11/1990

(Continued)

OTHER PUBLICATIONS

Reith, L.A.; "Issues Relating to the Performance of Optical Connectors and Splices," *Passive Fiber Optic Components and Their Reliability* (Apr. 6-8, 1993); SPIE vol. 1973; Berlin, DE; Bellingham, WA, US; pp. 294-305.

*Primary Examiner*—Michelle R Connelly Cushwa
(74) *Attorney, Agent, or Firm*—Gregg H. Rosenblatt

(57) ABSTRACT

A straight type optical connector enables a splicing operation of an optical fiber cable accurately and stably without requiring skilled labor and having a superior on-site installation property. An optical connector is provided with a splicing section for securely supporting an incorporated optical fiber securely supported at a ferrule and an optical fiber of an outside optical fiber cable in an end-abutting condition. The body of the optical connector is provided with a cable holding member able to hold an optical fiber cable. The cable holding member can be set at a temporary position where it makes an optical fiber of the optical fiber cable abut against the incorporated optical fiber at the splicing section in the state holding the optical fiber cable and bends a covered optical fiber of the optical fiber cable between the splicing section and the cable holding member by a pressing force in the lengthwise direction.

6 Claims, 22 Drawing Sheets

U.S. PATENT DOCUMENTS

| | | | |
|---|---|---|---|
| 4,309,071 A * | 1/1982 | Prunier | 385/60 |
| 4,611,887 A | 9/1986 | Glover et al. | |
| 5,042,902 A | 8/1991 | Huebscher et al. | |
| 5,067,226 A * | 11/1991 | Egner et al. | 29/452 |
| 5,082,344 A | 1/1992 | Mulholland et al. | |
| 5,129,023 A | 7/1992 | Anderson et al. | |
| 5,159,653 A | 10/1992 | Carpenter et al. | |
| 5,189,717 A | 2/1993 | Larson et al. | |
| 5,347,603 A | 9/1994 | Belenkiy et al. | |
| 5,363,460 A | 11/1994 | Marazzi et al. | |
| 5,390,272 A | 2/1995 | Repta et al. | |
| 5,394,496 A | 2/1995 | Caldwell et al. | |
| 5,461,690 A | 10/1995 | Lampert | |
| 5,542,015 A | 7/1996 | Hultermans | |
| 5,619,610 A | 4/1997 | King et al. | |
| 5,682,450 A | 10/1997 | Patterson et al. | |
| 5,694,506 A * | 12/1997 | Kobayashi et al. | 385/60 |
| 5,710,851 A | 1/1998 | Walter et al. | |
| 5,732,174 A | 3/1998 | Carpenter et al. | |
| 5,734,770 A | 3/1998 | Carpenter et al. | |
| 5,761,360 A | 6/1998 | Grois et al. | |
| 5,812,718 A | 9/1998 | Carpenter et al. | |
| 5,940,561 A | 8/1999 | Dean et al. | |
| 5,963,699 A | 10/1999 | Tanaka et al. | |
| 5,993,070 A | 11/1999 | Tamekuni et al. | |
| 6,193,421 B1 | 2/2001 | Tamekuni et al. | |
| 6,224,268 B1 | 5/2001 | Manning et al. | |
| 6,302,592 B1 | 10/2001 | Züllig | |
| 6,457,878 B2 | 10/2002 | Edwards et al. | |
| 6,595,696 B1 | 7/2003 | Zellak | |
| 6,623,173 B1 | 9/2003 | Grois et al. | |
| 7,011,454 B2 | 3/2006 | Caveney et al. | |
| 7,140,787 B2 | 11/2006 | Yamauchi et al. | |
| 7,270,487 B2 | 9/2007 | Billman et al. | |
| 7,280,733 B2 | 10/2007 | Larson et al. | |
| 7,331,718 B2 | 2/2008 | Yazaki et al. | |
| 7,454,117 B2 | 11/2008 | Carpenter et al. | |
| 2001/0043777 A1 | 11/2001 | Lu | |
| 2001/0048790 A1 | 12/2001 | Burkholder et al. | |
| 2003/0108303 A1 | 6/2003 | Asada | |
| 2003/0147597 A1 | 8/2003 | Duran | |
| 2004/0252949 A1 | 12/2004 | Verhagen | |
| 2005/0063662 A1 | 3/2005 | Carpenter et al. | |
| 2006/0165352 A1 | 7/2006 | Caveney et al. | |
| 2007/0133926 A1 | 6/2007 | Semmler et al. | |
| 2007/0147741 A1 | 6/2007 | Meek et al. | |
| 2007/0172179 A1 | 7/2007 | Billman et al. | |

FOREIGN PATENT DOCUMENTS

| | | | |
|---|---|---|---|
| EP | 0 546 936 A1 | 6/1993 | |
| EP | 0 742 456 A1 | 11/1996 | |
| EP | 1 054 278 A2 | 11/2000 | |
| EP | 1 072 914 A | 1/2001 | |
| EP | 1 162 486 A2 | 12/2001 | |
| FR | 2 464 490 | 3/1981 | |
| FR | 2464490 A * | 4/1981 | |
| JP | 58-152215 | 9/1983 | |
| JP | UM 3022015 | 12/1995 | |
| JP | 10-111434 | 4/1998 | |
| JP | 2000-235132 | 8/2000 | |
| JP | 2001-83385 | 3/2001 | |
| JP | 2002-23006 | 1/2002 | |
| JP | 2003-161863 | 6/2003 | |
| JP | 2003-177275 | 6/2003 | |
| JP | 3445479 | 6/2003 | |
| JP | 2005-265973 | 9/2005 | |
| JP | 2005-265974 | 9/2005 | |
| JP | 2005-265975 | 9/2005 | |
| JP | 2005-266086 | 9/2005 | |
| JP | 2005-266087 | 9/2005 | |
| JP | 2005-266088 | 9/2005 | |
| WO | WO 93/21547 | 10/1993 | |
| WO | WO 95/07794 | 3/1995 | |
| WO | WO 2004/001472 A1 | 12/2003 | |

* cited by examiner

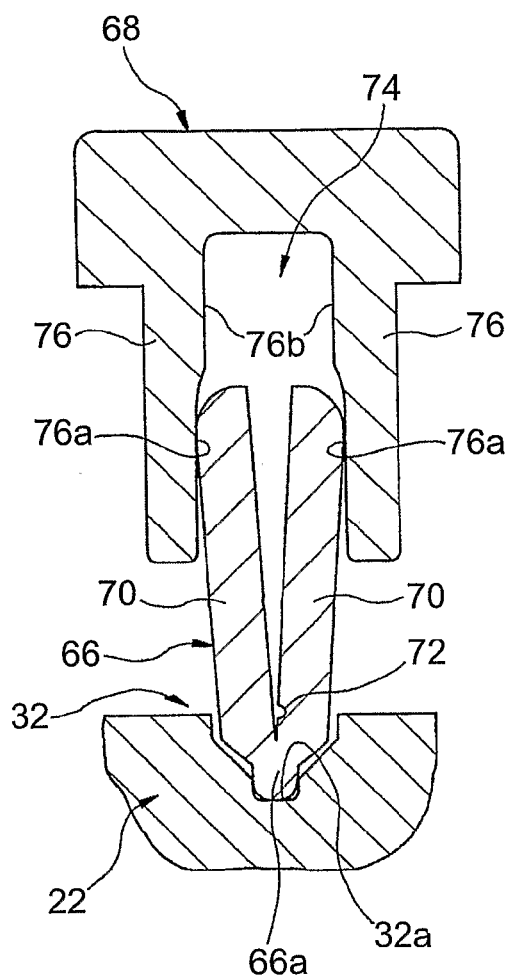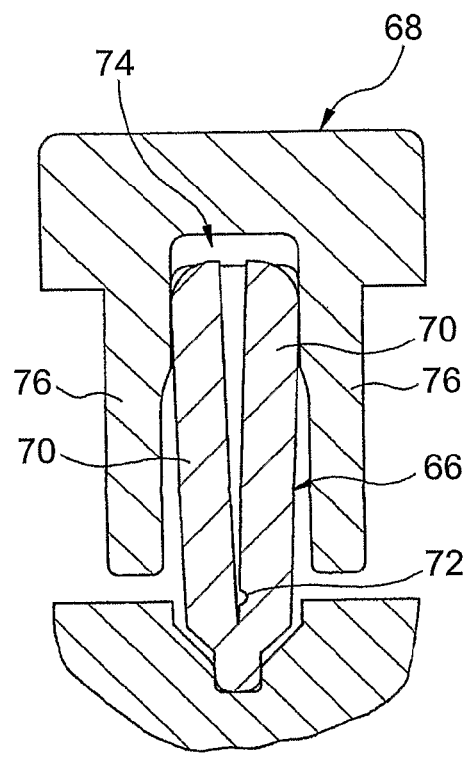
FIG. 7a
FIG. 7b ized filing under 35 U.S.C.
OPTICAL CONNECTOR AND OPTICAL FIBER CONNECTING SYSTEM This application is a national stage filing under 35 U.S.C. 371 of PCT/US2005/022401 filed Jun. 23, 2005, which claims priority to Japanese Application No. 2004-210251, filed Jul. 16, 2004, the disclosure of which is incorporated by reference in its entirety herein.

TECHNICAL FIELD

The present invention relates to optical fiber connecting technology, and more particularly to an optical connector including a ferrule and a splicing section, both arranged in a body; and an optical fiber connecting system composed of such an optical connector and another optical connector combined together.

BACKGROUND

In optical fiber connecting technology, there is known an optical connector provided with, at a common connector body, a ferrule for securely supporting an optical fiber having a predetermined length (in the present specification, called an "incorporated optical fiber") and a splicing section near the ferrule and able to operate for gripping under pressure a part of the incorporated optical fiber projecting out from the ferrule and an optical fiber of an optical fiber cable introduced from the outside (for example, see Japanese Patent No. 3445479). This type of optical connector with a splicing section is being used often as being able to easily form a connection part of an optical transmission line able to be freely connected and separated in particular at the installation site of the optical transmission line.

An optical connector with a splicing section is generally formed with the front end face of the incorporated optical fiber secured in the fiber holding channel of the ferrule made smooth by polishing the abutting end face of the ferrule (that is, the face which will abut against the ferrule of the other optical connector) in advance in the connector production plant or other facility and with the rear end face of the projecting portion of the incorporated optical fiber projecting out from the other end of the ferrule made smooth by slicing using a cutting tool. Further, the splicing section is provided with a fiber securing member provided with a straight securing groove able to be arranged coaxially with respect to a fiber holding channel of the ferrule so as to be able to operate between a closed position securely gripping the projecting portion of the incorporated optical fiber in the securing groove and an open position releasing that projecting portion. When the optical connector is not being used, the projecting portion of the incorporated optical fiber projecting from the ferrule is received in the securing groove of the fiber securing member of the splicing section at the open position or closed position and arranged at a predetermined centering position.

Said optical connector can be attached to the terminal end of an optical fiber cable with a high precision and low loss by performing the required cable terminating operation and splicing operation on the optical fiber cable to be attached at the installation site of an optical transmission line. Specifically, as the cable terminating operation, the sheath is stripped off a desired length of the terminal end of the optical fiber cable to expose the covered optical fiber, the covering is stripped off a desired length of the terminal end of the covered optical fiber to expose the optical fiber, and the exposed optical fiber is sliced to a predetermined length by a cutting tool. Further, in the splicing operation, the fiber securing member of the splicing section of the optical connector is set to the open position, the exposed optical fiber of the optical fiber cable is inserted in the securing groove of the fiber securing member, the sliced end face of the cable optical fiber is made to abut against the rear end face of the projecting portion of the incorporated optical fiber in the securing groove, and in that state the fiber securing member is moved to the closed position. Due to this, the incorporated optical fiber and the cable optical fiber are securely supported in a concentric end-abutting condition, whereby the optical connector is attached to the optical fiber cable.

Here, at the time of the splicing operation, before moving the fiber securing member of the splicing section from the open position to the closed position, it is necessary to make the incorporated optical fiber and the optical fiber of the optical fiber cable accurately abut against each other at their end faces. This accurate abutting condition is secured by bringing the incorporated optical fiber and the cable optical fiber into contact at their end faces in the securing groove of the fiber securing member, then applying a suitable pressing force in the lengthwise direction toward the fiber securing member to the covered optical fiber of the optical fiber cable. At this time, the covered optical fiber is bent somewhat at the outside of the fiber securing member due to the pressing force in the lengthwise direction. Further, a special assembly tool has been proposed in the past which can hold the covered optical fiber of the optical fiber cable in the bent state so as to maintain the pressed abutting state of the end faces of the optical fibers while moving the fiber securing member from the open position to the closed position until finishing the splicing operation (for example, see Japanese Unexamined Patent Publication (Kokai) No. 2002-23006).

The assembly tool described in JP 2002-23006 is provided with a connector mount for mounting the body of an optical connector, an operating part for operating the fiber securing member of the optical connector, and a fiber holding part for holding the covered optical fiber of the optical fiber cable at a predetermined position with respect to the optical connector—all suitably arranged on a single base. The fiber holding part is provided with a gripping member comprised of a sponge or other elastic material and can grip the covered optical fiber by a suitable elastic force in a slit provided in the gripping member. At the time of a splicing operation of the optical connector, the optical fiber exposed at the terminal end of the optical fiber cable is inserted into the fiber securing member of the optical connector mounted at the connector mount, then the covered optical fiber is inserted into the gripping member of the fiber holding part while applying a suitable pressing force in the lengthwise direction toward the optical connector to the covered optical fiber. In this state, the covered optical fiber is suitably bent between the optical connector and the gripping member. Due to this, it is confirmed that the incorporated optical fiber and the optical fiber of the optical fiber cable are made to accurately abut against each other in the securing groove of the fiber securing member (normally not visible). Therefore, by moving the fiber securing member from the open position to the closed position while maintaining the bent state of the covered optical fiber, the two optical fibers can be made to connected accurately abutting against each other.

Note that in the present specification, the "covered optical fiber" means a member including a soft covering on the outer surface of the cladding of an optical fiber, while the "optical fiber" means a member stripped of this covering. Further, an "optical fiber cable" means a member including one or more covered optical fibers accommodated together with a tension member in a sheath (generally a plastic sheath), and includes an "optical fiber cord" as well in its broad definition.

Incidentally, in an optical transmission line, an optical fiber connecting system using optical connectors is required to be able to maintain a suitable optical connection condition against any external force such as tension applied to the optical fiber cable. In particular, to prevent the spliced portion of the optical fiber cable and an optical connector from damage due to tension or other external force, there is known an optical connector comprised of a connector body provided with a cable holding part able to securely hold the optical fiber cable (for example, see Japanese Utility Model Registration No. 3022015).

The optical connector described in JP UM 3022015 has, as a cable holding part, a securing member having a U-groove portion able to be arranged in a fiber passage provided in the connector body and movably attached to the connector body. At the time of a splicing operation, the securing member is set at a position on the connector body opening the fiber passage, the end portion of the optical fiber cable is inserted in the fiber passage, then the securing member is pushed into the fiber passage to insert the sheath of the optical fiber cable into the U-groove portion under pressure. Due to this, the optical fiber cable is securely held at the connector body. At this time, a special tool having a cable receiving part is used, the cable receiving part is pushed into the fiber passage of the connector body from the opposite side to the securing member, the optical fiber cable is gripped between the securing member and the cable receiving part, and the optical fiber cable is inserted into the U-groove portion of the securing member.

Here, an optical fiber cable, comprised of one or more covered optical fiber and a pair of tension members (for example, steel wires, FRP (fiber reinforced plastic) cords, etc.) arranged at both lateral sides of the covered optical fiber, which are accommodated in a plastic sheath with substantially no clearance therebetween, is known as a drop optical fiber for an aerial access line (for example, see Japanese Kokai No. 2001-83385). The conventional drop optical cable has a pair of channels extending in the lengthwise direction at opposite positions on the outer surface of the sheath, and, at the time of the cable terminating operation of the drop optical cable, it is possible to tear apart the sheath in the lengthwise direction along the pair of channels so as to easily expose the covered optical fiber.

Conventionally, when attaching an optical connector to the terminal end of such a drop optical cable, the pair of tension members of the terminated drop optical cable are mechanically secured to the connector body by a securing member provided at the optical connector (for example, see Japanese Kokai No. 2003-177275). The optical connector described in JP 2003-177275 is provided at the end at the fiber introduction side of the connector body with a securing member having a passage for the covered optical fiber and a friction area at the outer surface positioned around that passage. The drop optical cable is securely connected to the body of the optical connector by inserting the covered optical fiber into the passage of the securing member to secure it to the ferrule, then arranging the pair of torn apart sheath portions containing the tension members to follow along the friction area at the outer surface of the securing member and tightening a metal fitting from the outside of the two sheath portions to press against the friction area under pressure.

Note that in optical fiber connecting systems using optical connectors, there is known a configuration using a pair of optical connectors having engaging parts of different shapes complementarily engageable with each other at their bodies (so-called "plug" and "socket"). For example, in access work for extending and laying optical fiber cables from a public optical fiber network to individual houses, generally socket-type optical connectors attached to the terminal ends of optical fiber cables are provided at switchboxes provided at desired positions in the houses in accordance with household electrical wiring work. Further, the optical terminals used in houses and optical connectors in the switchboxes are configured so as to be detachably attached using optical fiber cords provided with plug-type optical connectors at their front ends.

In such an application, when installing an optical connector in a limited space such as a switchbox, it is sometimes necessary to lay the optical fiber cable extended from the rear end of the optical connector bent by a large amount near the optical connector. At this time, from the viewpoint of suppressing optical loss, there is proposed an optical connector provided with a cable holding part for holding the optical fiber cable in a state bent to a predetermined radius so as to prevent the covered optical fiber from being bent by a radius smaller than the prescribed smallest bending radius (in the present specification, called an "angle type optical connector") (for example, see Japanese Kokai No. 2003-161863). As opposed to this, an optical connector without spatial restrictions such as a plug-type optical connector to be attached to an optical fiber cord is provided with a cable holding part for holding the optical fiber cable straight with respect to the ferrule, so is called a "straight type optical connector" in the present specification.

SUMMARY

To address the objects described herein, an embodiment of the invention described herein provides an optical connector, comprising a body; a ferrule provided in the body; an incorporated optical fiber with a predetermined length, securely supported on the ferrule; and a splicing section provided in the body near the ferrule and able to operate so as to securely support the incorporated optical fiber projecting out from the ferrule and an optical fiber of an optical fiber cable introduced from outside of the body in an end-abutting condition, characterized in that the optical connector further comprises a cable holding member provided in the body at a location opposite to the ferrule with the splicing section disposed therebetween, the cable holding member being able to hold an optical fiber cable; and in that the cable holding member is movable with respect to the body in a direction substantially parallel to an extending direction of the incorporated optical fiber; the cable holding member being able to be set, in the state holding the optical fiber cable, at a temporary position where the cable holding member makes the optical fiber of the optical fiber cable abut against the incorporated optical fiber in the splicing section and bends a covered optical fiber of the optical fiber cable between the splicing section and the cable holding member by a lengthwise pressing force.

In another aspect, an optical connector further comprises an anchoring structure for temporarily anchoring the cable holding member at the temporary position on the body.

In another aspect, the cable holding member of an optical connector is able to be set at a finished position where, after the splicing section securely supports the incorporated optical fiber and the optical fiber of the optical fiber cable in the end-abutting condition, the lengthwise pressing force applied to the covered optical fiber of the optical fiber cable is released.

In another aspect, an optical connector comprises an anchoring structure for anchoring the cable holding member at the finished position on the body.

In another aspect, an optical connector body includes an indicator showing a fact that the cable holding member is located at the temporary position in a manner visually confirmable from outside of the body.

In yet another aspect, the cable holding member of an optical connector as described above is provided with a receptive groove for receiving the optical fiber cable and an engaging projection for engaging with a sheath of the optical fiber cable in the receptive groove and statically holding the optical fiber cable in the receptive groove.

In still another aspect, an optical fiber connecting system comprises a first optical connector as described above and a second optical connector having a second ferrule to be concentrically abutted against the ferrule of the first optical connector; the first and second optical connectors being detachably combined with each other.

As explained above, in a conventional optical connector with a splicing section, at the time of a splicing operation of an optical fiber cable, a special tool is used to maintain the covered optical fiber in a suitable bent state under a pressing force in the lengthwise direction at the outside of the connector while moving the fiber securing member of the splicing section from the open position to the closed position so as to connect the incorporated optical fiber and the optical fiber of the optical fiber cable in an accurately abutting condition. Such a tool, as described in JP 2002-23006, is provided at least with a connector mount, an operating part, and a fiber holding part, so tends to become larger in outer dimensions than the optical connector. Due to this, the work efficiency of the splicing operation on the installation site of an optical transmission line sometimes deteriorates. Further, when using a tool, at the time of bending the covered optical fiber at the outside of the optical connector and inserting it into the gripping member of the fiber holding part, careful attention and skilled labor are required so as to prevent application of more than the necessary tension to the covered optical fiber and to prevent deviation in the position of the optical fiber inserted into the splicing section of the optical connector.

On the other hand, looking at the cable holding part provided at a conventional optical connector, in the configuration described in JP UM 3022015, a special tool is used to insert the sheath of the optical fiber cable under pressure into a U-groove portion of the securing member. At this time, the position of the optical fiber cable inserted at the U-groove portion at the connector body is determined by the relative positional relationship of the tool and the connector body, but this depends on the experienced judgment of the worker. Therefore, when attaching an optical connector to an optical fiber cable of a different sheath outside diameter, it becomes difficult to arrange the covered optical fiber accurately concentrically with the ferrule in the optical connector and as a result the optical loss is liable to increase.

Further, as described in JP 2003-177275, conventional optical connectors have been configured to use tightening of metal fittings for the cable holding parts for aerial drop optical cables, so the number of parts of the optical connectors and the number of steps of the assembly work tended to increase. Note that, in an optical connector with a splicing section, no cable holding part for directly holding an optical fiber cable together with the sheath thereof, such as an aerial drop optical cable, in which a covered optical fiber and a tension member are accommodated in a plastic sheath with substantially no clearance therebetween, has been realized. This appears to be caused by a fact that, while it is possible for a general optical fiber cable, accommodating a covered optical fiber and a tension member in a sheath with a clearance therebetween, to absorb the bending of the covered optical fiber, which may generate due to the abutment of a cable-side optical fiber to an incorporated optical fiber in the splicing section, at the interior of the sheath (in other words, the sheath may not be bent in itself), it is difficult for an optical fiber cable such as the aerial drop optical cable to do so. Therefore, in the case where the optical connector having the splicing section is attached to the optical fiber cable such as the aerial drop optical cable, it has been necessary to use the special tool as described above.

Thus, an object of the present invention is to provide a straight-type optical connector having a ferrule and a splicing section which enables a splicing operation of an optical fiber cable to be performed accurately and stably without requiring skilled labor and which has a superior on-site installation property.

Another object of the present invention is to provide a straight-type optical connector having a ferrule and a splicing section, which has a cable holding part able to directly hold an optical cable together with the sheath thereof, such as an aerial drop optical cable, in which a covered optical fiber and a tension member are accommodated in a plastic sheath with substantially no clearance therebetween.

Still another object of the present invention is to provide an optical fiber connecting system comprised of a pair of optical connectors combined together which enables a splicing operation of an optical fiber cable to an optical connector to be performed accurately and stably and which improves the on-site installation property.

According to the embodiments described in above, at the time of the splicing operation of an optical fiber cable, by setting the cable holding member at the temporary position, it is possible to maintain the covered optical fiber of the optical fiber cable in a suitably bent state under a pressing force in the lengthwise direction inside the optical connector (that is, between the splicing section and the cable holding member). Further, by moving the splicing section in this state, it is possible to connect the incorporated optical fiber and the optical fiber of the optical fiber cable in the state with the two end faces accurately abutted together. Therefore, there is no longer a need for using a conventional assembly tool having a fiber holding part. As a result, the work efficiency of the splicing operation at the installation site of the optical transmission line is remarkably improved. Further, it is possible to bend the covered optical fiber without directly touching the covered optical fiber by just moving the cable holding member to the temporary position, so the danger of more than the necessary tension being applied to the covered optical fiber or the position of the optical fiber inserted into the splicing section deviating is eliminated. Therefore, the splicing operation of the optical fiber cable can be performed accurately and stably without requiring skilled labor and a superior on-site installation property can be realized. The optical connector having this structure is capable of directly holding an optical cable together with the sheath thereof, such as an aerial drop optical cable, in which a covered optical fiber and a tension member are accommodated in a plastic sheath with substantially no clearance therebetween.

According to the embodiments described above, in a splicing operation of an optical fiber cable, after arranging the cable holding member at the temporary position once, even if letting go of the cable holding member, the covered optical fiber can be reliably maintained in the suitably bent condition, so the work of moving the splicing section becomes much easier.

According to the embodiments described above, after finishing the splicing operation at the splicing section, the cable holding member is moved to the finished position to substantially release the pressing force in the lengthwise direction applied to the covered optical fiber of the optical fiber cable, so it is possible to sufficiently reduce the optical loss at the portion of the covered optical fiber of the optical fiber cable and possible to increase the lifetime at that portion of the covered optical fiber.

According to the embodiments described above, after finishing the splicing operation of the optical fiber cable and arranging the cable holding member at the finished position, even if tension or other external force is applied to the optical fiber cable, the cable holding member is mechanically stopped stably at the finished position, so the danger of unintentional tension being applied to the covered optical fiber is eliminated.

According to the embodiments described above, even if a worker finds it difficult to visually confirm the bent state of the covered optical fiber, it is possible to judge if the cable holding member is at the finished position by the indicator.

According to the embodiments described above, since a one-piece cable holding member is used to engage the sheath of the optical fiber cable with an engaging projection of a receptive groove so as to hold the optical fiber cable, a very simple cable holding structure is realized, in comparison with the prior art such as tightening a metal fitting, and it is thus possible to reduce the number of parts and number of assembly steps of the optical connector.

According to the embodiments described above, in an optical fiber connecting system comprised of a pair of optical connectors combined together, it becomes possible to accurately and stably perform a splicing operation of an optical fiber cable to the optical connectors and the on-site installation property is improved.

BRIEF DESCRIPTION OF THE DRAWINGS

FIG. 7 shows views for explaining the operation of the splicing section of FIG. 6, wherein (a) shows the open position and (b) shows the closed position.

DETAILED DESCRIPTION

The present invention provides optical fiber connecting technology which can be applied extremely well to applications where a superior on-site installation property and safety are required such as detachable optical splices at optical transmission lines arranged indoors.

Below, embodiments of the present invention will be explained in detail with reference to the attached drawings. Throughout the figures, corresponding components are assigned common reference notations.

Figure 1:
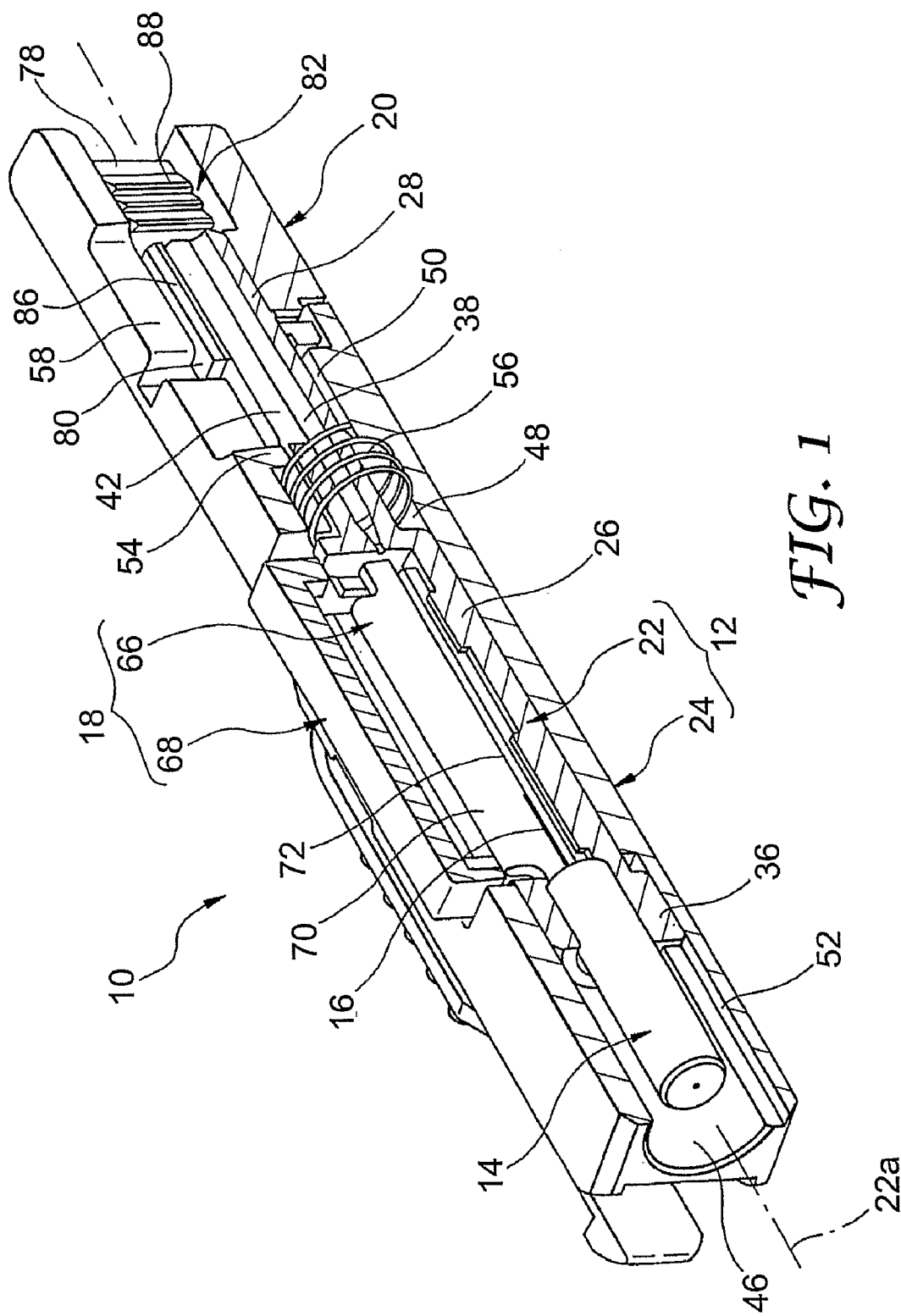
FIG. 1 is a cross-sectional perspective view of an optical connector according to an embodiment of the present invention.
Figure 2:
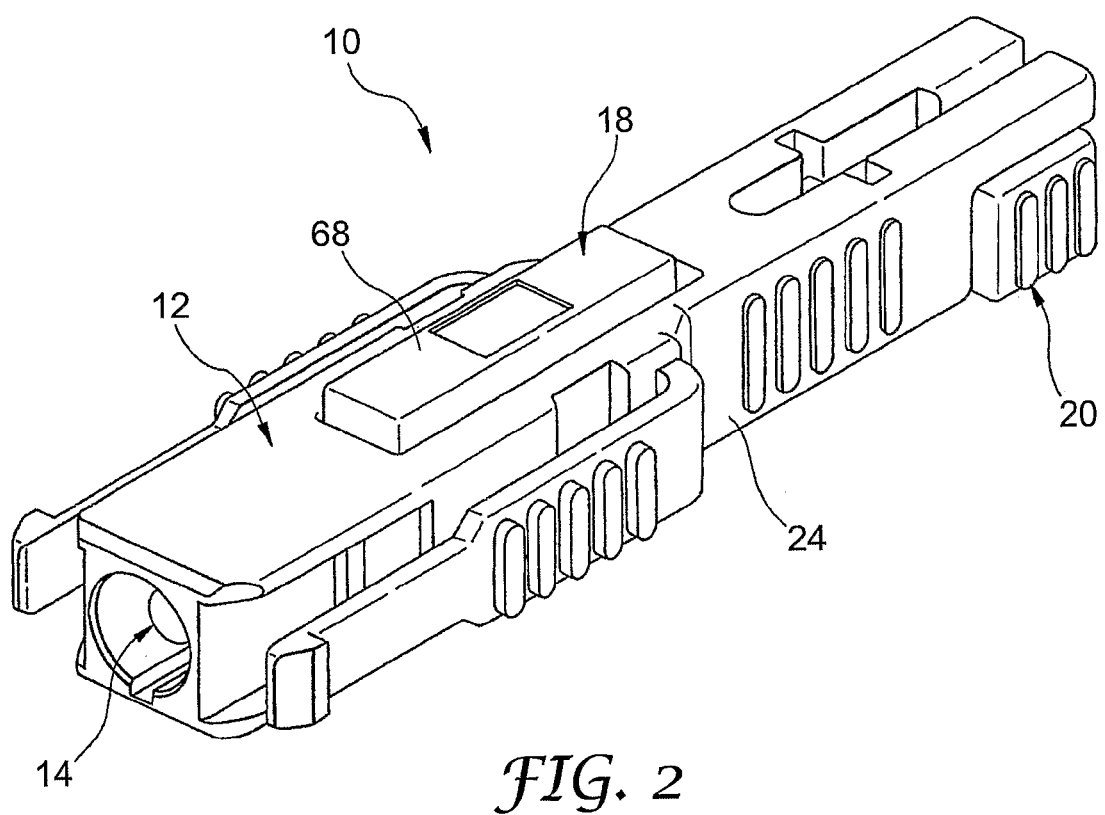
FIG. 2 is an overall perspective view of the optical connector of FIG. 1.

FIG. 1 and FIG. 2 are views of a straight type optical connector 10 according to an embodiment of the present invention, while FIG. 3 to FIG. 8 are views of components of the optical connector 10. The optical connector 10 in particular enables a connection part of an optical transmission line able to be freely connected and separated to be easily formed at the installation site of the optical transmission line. Further, the optical connector 10 is a straight type optical connector provided with a cable holding part for holding an optical fiber cable straight with respect to the ferrule.

As shown in FIG. 1 and FIG. 2, the optical connector 10 is comprised of a body 12, a ferrule 14 provided at the body 12, an incorporated optical fiber 16 of a predetermined length securely supported at the ferrule 14, a splicing section 18 provided at the body 12 near the ferrule 14 and able to operate so as to securely support the incorporated optical fiber 16 projecting out from the ferrule 14 and an optical fiber of an optical fiber cable introduced from outside of the body 12 in an end-abutting condition, and a cable holding member 20 provided at the body 12 at an opposite side to the ferrule 14 from the splicing section 18 and able to hold an optical fiber cable.

The body 12 is comprised of a hollow inner cylinder 22 in which the ferrule 14 is secured and a hollow outer housing 24 accommodating the inner cylinder 22 slidably in an axial direction. The inner cylinder 22 and the outer housing 24 can both be formed integrally from a suitable plastic material by for example injection molding.

Figure 3A:
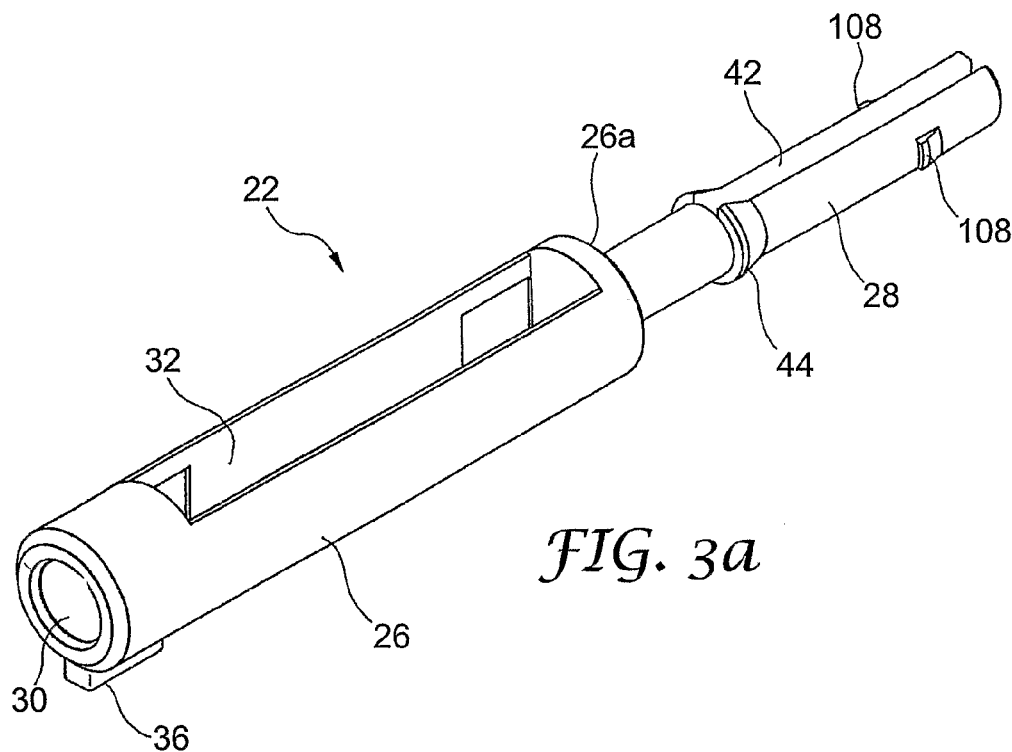
FIG. 3(a) is an overall perspective view and FIG. 3(b) is a cross-sectional perspective view of an inner cylinder forming part of the body of the optical connector of FIG. 1.

As shown in FIGS. 3(a) and (b), the inner cylinder 22 is a stepped tubular shaped member having a center axis 22a. A large outer diameter front portion 26 and a small outer diameter rear portion 28 are integrally formed adjoining each other in the axial direction. The front portion 26 is open at its front end in the axial direction (left end in the figure) and is formed with a first recess securely receiving the ferrule 14 and is open to one side of the first recess 30 at its rear in the axial direction (right in the figure), where a second recess 32 in which a splicing section 18 is placed is formed. The first recess 30 and the second recess 32 are communicated with each other through a fiber insertion bore 34 positioned on the center axis 22a. Further, the outside surface of the front portion 26 is provided with a rib 3 extending in the axial direction at the opposite side to the side opening of the second recess 32 at a position corresponding to the first recess 30.

On the other hand, the rear portion 28 of the inner cylinder 22 is formed with a fiber introduction bore 38 opening at the rear end in the axial direction (right end in the figure) and guiding an optical fiber of an optical fiber cable to the second recess 32 along the center axis 22a. The fiber introduction bore 38 and the second recess 32 are communicated with each other through a fiber introduction bore 40 positioned on the center axis 22a. Further, the cylindrical wall of the rear portion 28 defining the fiber introduction bore 38 is formed with a slit 42 extending from the rear end opening of the rear portion 28 to a middle position in the axial direction at the same side as the opening of the second recess 32 of the front portion 26. Further, the outer surface of the rear portion 28 is formed with a stop ring 44 projecting out slightly to the outside in the diametrical direction and extending in a ring shape around the axis 22a.

Figure 4:
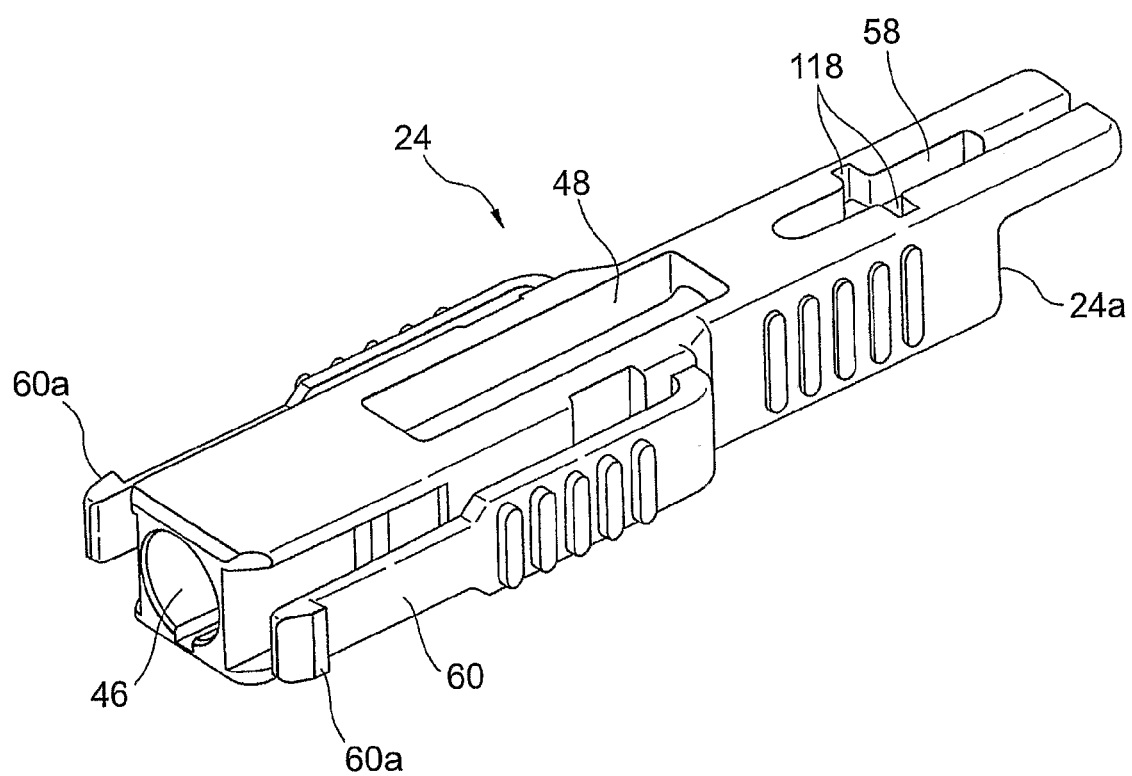
FIG. 4 is a perspective view of an outer housing forming part of the body of the optical connector of FIG. 1.

As shown in FIG. 1 and FIG. 4, the outer housing 24 of the body 12 is provided with a first cavity 46 opening at the front end in the axial direction (left end in the figure), a second cavity 48 opening at one side at the rear of the first cavity 46 in the axial direction (right in the figure), and a third cavity 50 opening at the rear end of the outer housing 24 in the axial direction (right in the figure) at the rear of the second cavity 48 in the axial direction—all communicating with each other. The first cavity 46 of the outer housing 24 receives the area of the front end 26 of the inner cylinder 22 having the first recess 30, the second cavity 48 receives the area of the front portion 26 of the inner cylinder 22 having the second recess 32 and part of the rear portion 28 adjoining it, and the third cavity 50 receives the remainder of the rear portion 28 of the inner cylinder 22. These cavities 46, 48, and 50 of the outer housing 24 receive the inner cylinder 22 as a whole with substantially no rattling in the diametrical direction and able to slide somewhat in the axial direction.

The first cavity 46 of the outer housing 24 is provided with a channel 52 extending in the axial direction at a position at the opposite side from the side opening of the second cavity 48. The channel 52 of the first cavity 46 receives a rib 36 provided at the outer surface of the inner cylinder 22 in a manner slidable in the axial direction. Due to this, the inner cylinder 22 is stopped positioned in the rotational direction about the axis 22a in the outer housing 24. Further, in this state, the side opening of the second recess 32 of the inner cylinder 22 is arranged positioned at the side opening of the second cavity 48 of the outer housing 24.

The second cavity 48 and the third cavity 50 of the outer housing 24 are provided between them with a wall 54 having a through hole through which the rear portion 28 of the inner cylinder 22 passes. The second cavity 48 of the outer housing 24 receives between a shoulder 26a (FIG. 3) between the front portion 26 and rear portion 28 of the inner cylinder 22 and the wall 54 a compression coil spring 56 so as to surround part of the rear portion 28. The compression coil spring 56 constantly elastically biases the inner cylinder 22 to the front in the axial direction. Here, the inner cylinder 22 is held against the elastic biasing force of the compression coil spring 45 so as not to detach from the cavities 46, 48, and 50 by a stop ring 44 provided at the rear portion 28 engaging with the end face of the wall 54 at the third cavity 50 side in the state correctly assembled in the outer housing 24. Further, the inner cylinder 22 can move to the rear in the axial direction against the biasing force of the compression coil spring 56 in the range where the projection 36 can slide along the channel 52 of the outer housing 24.

Further, the outer wall of the outer housing 24 defining the third cavity 50 is formed with a slit extending in the axial direction from the rear end of the outer housing 24 to the wall 54 at the same side as the opening of the second cavity 48. The slit 58 of the outer housing 24 is arranged positioned at the slit 42 of the inner cylinder 22 in the state with the inner cylinder 22 correctly assembled in the outer housing 24.

The outer housing 24 is further provided with a pair of elastic arms 60 projecting out to the two sides at positions on the outer surface corresponding to the second cavity 48 substantially in parallel with each other toward the front in the axial direction. The elastic arms 60 are integrally connected to the outer housing 24 at the base ends and reach near the front end face of the external housing 24 in the axial direction at the free ends of the terminal ends and are designed to be able to elastically bend about their base ends in directions to approach and move away from the outer housing 24. The terminal ends of the elastic arms 60 are provided with stop tabs 60a locally projecting outward.

Figure 5A:
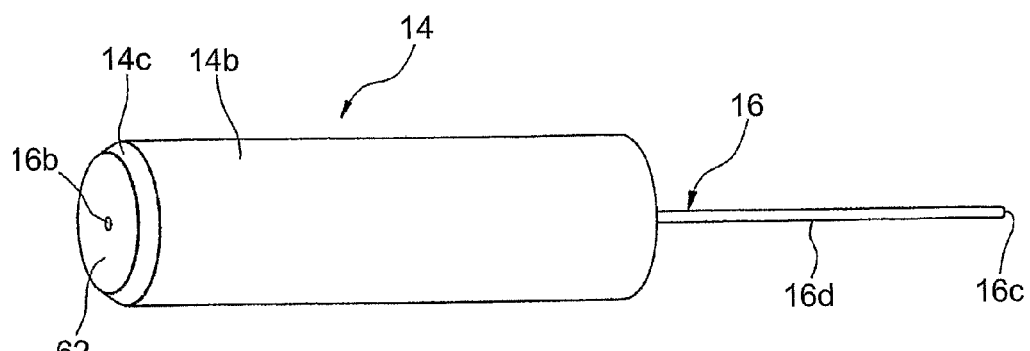
FIG. 5(a) is an overall perspective view and FIG. 5(b) is a cross-sectional view of a ferrule and an incorporated optical fiber built in the optical connector of FIG. 1.
Figure 5B:
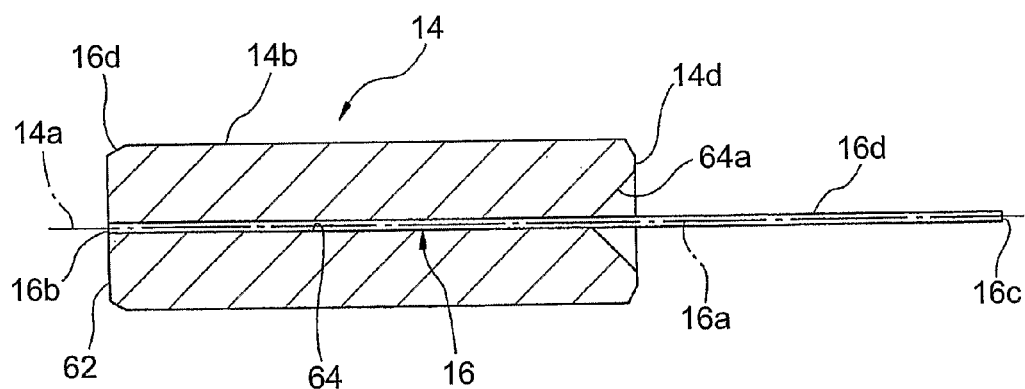

The ferrule 14 of the optical connector 10, as shown in FIGS. 5(a) and (b), is a tubular member formed with a single through hole along its center axis 14a for holding a fiber and has a cylindrical outer surface 14b functioning substantially overall as a single fiber centering part. The ferrule 14 is provided with an abutting end face 62 at one end in the axial direction extending flat substantially perpendicular to the center axis 14a and a fiber holding channel 64 opening at the center of the abutting end face 62 and extending straight along the center axis 14a. The abutting end face 62 is communicated with the cylindrical outer circumference 14b through a tapered surface 14c. The fiber holding channel 64 is enlarged in diameter from the tapered guide surface 64a at the opposite side from the abutting end face 62 and opens to a ring-shaped end face 14d of the other end in the axial direction. Note that the ferrule 14 can be fabricated from ceramic, plastic, etc.

The fiber holding channel 64 of the ferrule 14 has one incorporated optical fiber 16 having a predetermined length inserted in it and secured by an adhesive (not shown). The incorporated optical fiber 16 is arranged with its center axis 16a matching with the center axis 15a of the ferrule 14. Here, the incorporated optical fiber 16 usually is finished in formation of its axial direction end faces 16b and 16c at the connector production plant or other facility. Explaining this process in detail, first, any length of optical fiber is inserted into the fiber holding channel 64 of the ferrule 14 and secured by an adhesive, then the abutting end face 62 of the ferrule 14 is polished, whereby the end face of the optical fiber exposed at the abutting end face 62 is made a flat surface the same as the abutting end face 62 and a flat front end face 16b perpendicular to the axial line 16a is formed. Further, a predetermined location of the optical fiber projecting out from the ring-shaped end face 14d of the ferrule is sliced and cut using a cutting tool, whereby a flat rear end face 16c perpendicular to the axis 16a is formed and a projecting portion 16d of a predetermined length is formed.

The ferrule 14 is secured to the first recess 30 of the inner cylinder 22 by press-fitting or adhesion at an area near the ring-shaped end face 14d. In this state, the axis 14a of the ferrule 14 is arranged matched with the axis 22a of the inner cylinder 22, and a main length portion of the ferrule 14 including the abutting end face 62 is arranged substantially concentrically inside the first cavity 46 of the outer housing 24 with some space. Further, the projecting portion 16d of the incorporated optical fiber 16 is passed through the fiber insertion bore 34 of the inner cylinder 22 and extended to the inside of the second recess 32.

Figure 6A:
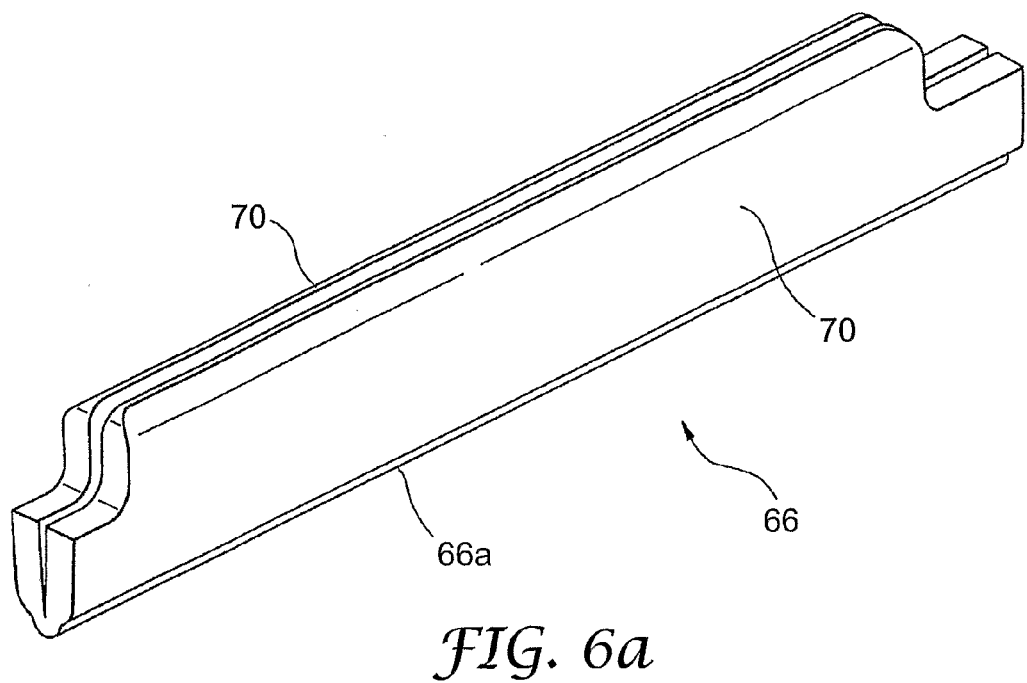
FIG. 6 shows views of a splicing section built in the optical connector of FIG. 1, wherein (a) is a perspective view of a fiber securing member and (b) is a perspective view of an actuating member.
Figure 6B:
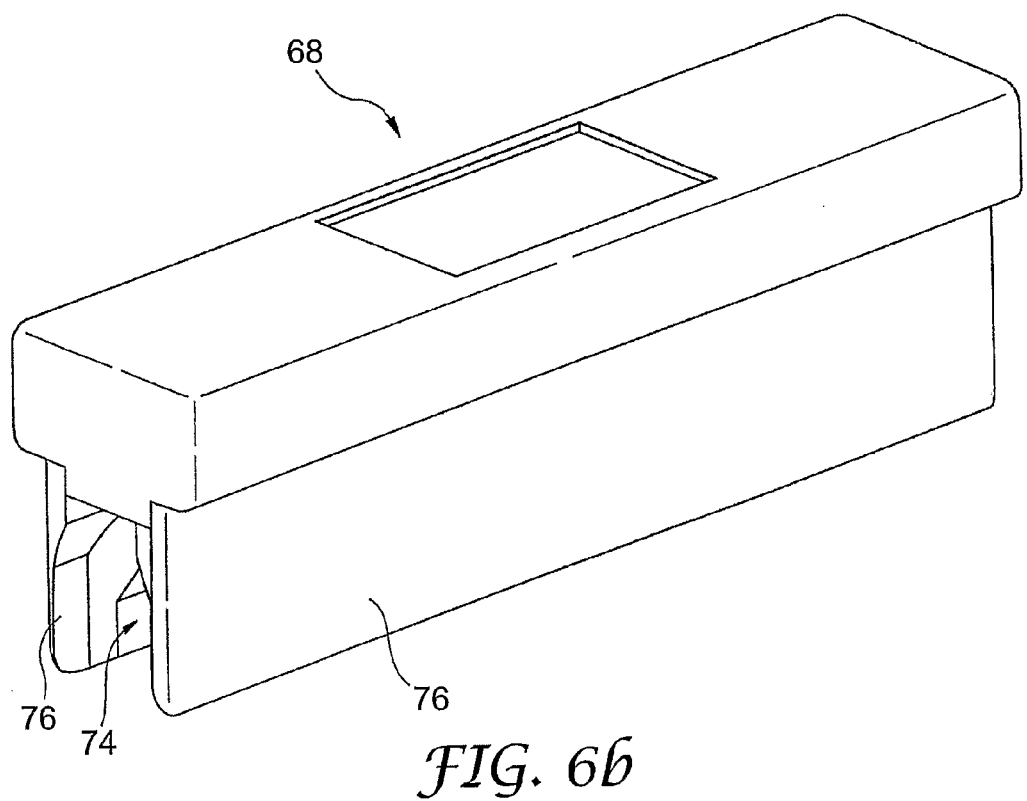
Figure 8:
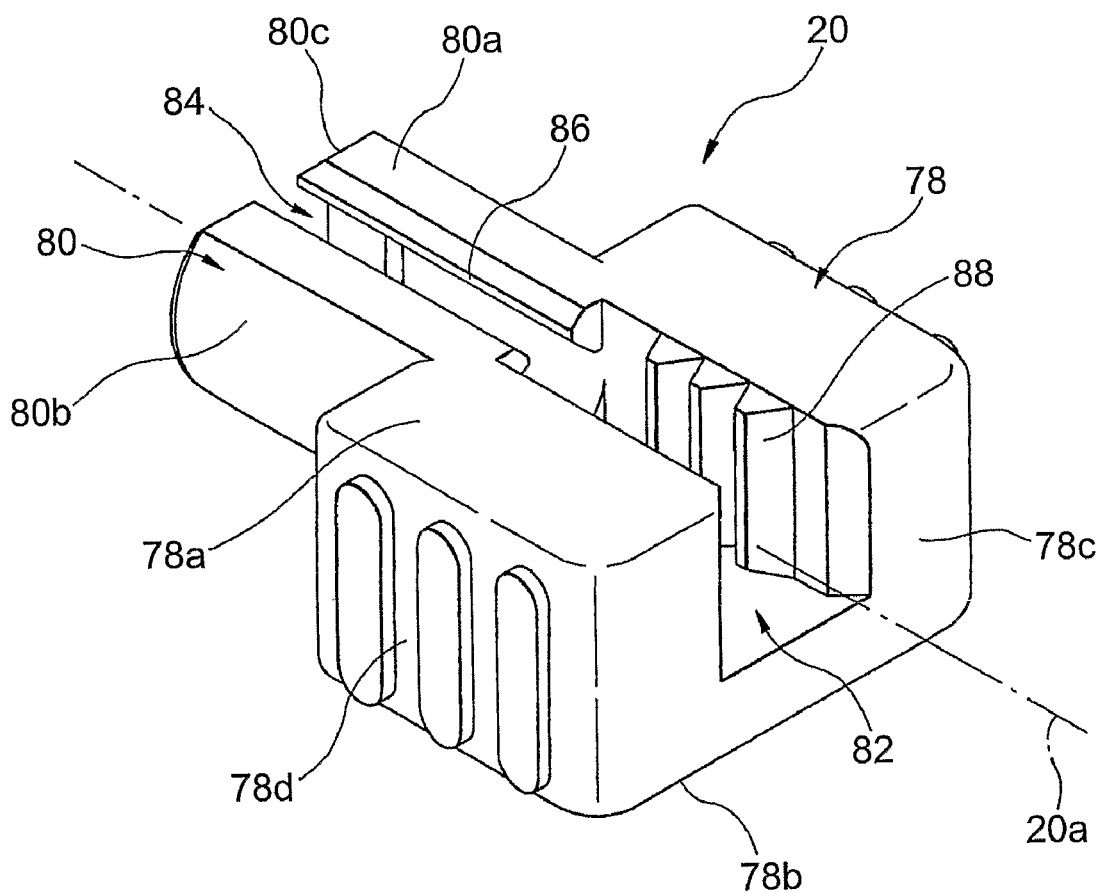
FIG. 8 is a perspective view of a cable holding member built in the optical connector of FIG. 1.

The splicing section 18 of the optical connector 10, as shown in FIG. 1 and FIG. 6, is comprised of a fiber securing member 66 accommodated in the second recess 32 of the inner cylinder 22 of the body 12 and able to open and close (FIG. 6(a)) and an actuating member 68 accommodated in the second recess 32 and opening and closing the fiber securing member 66 (FIG. 6(b)). The fiber securing member 66 is comprised of a thin sheet member formed into a predetermined shape in advance from aluminum or another malleable material and folded into two along its center axis. The folded fiber securing member 66 is therefore provided with a pair of wings 70 arranged across a butterfly joint 66a along its fold. Predetermined positions of the facing surfaces of the wings 70 (in the illustrated embodiment, one wing 70) are formed with straight securing grooves 72 (for example, V-grooves with V-cross sections) able to be arranged coaxially with the fiber securing channel 64 of the ferrule 14 parallel with the butterfly joint 66a.

The pair of wings 70 of the fiber securing member 66 are designed to be able to rock about the butterfly joint 66a, that is, open and close, along with elastic deformation of the material at the area of the butterfly joint 66a. Usually, the fiber securing member 66 is placed in an open position (FIG. 7(a)) where the two wings 70 are separated from each other somewhat at their facing surfaces. By applying external force from the open position to the direction separating the two wings 70 from each other, the facing surfaces displace to the closed position where they are further brought together against the elastic return force of the butterfly joint 66a (FIG. 7(b)). When the fiber securing member 6 is at the open position, the projecting portion 16d of the incorporated optical fiber 16 secured to the ferrule 14 is arranged adjoining the securing groove 72 in parallel to it, while the optical fiber (not shown) of the optical fiber cable inserted from the outside can be smoothly withdrawn from and inserted into the securing groove 72. Further, when the fiber securing member 66 is at the closed position, the projecting portion 16d of the incorporated optical fiber 16 and the optical fiber of the outside optical fiber cable are tightly received in the securing groove 72 and are strongly securely supported at the securing groove 72 under pressure received from the two wings 70.

The actuating member 68 is for example a lid-shaped member comprised of a one-piece molding of a plastic material and is provided with a pair of holding walls 76 for defining a recess 74 of dimensions enabling the two wings 70 of the fiber securing member 66 to be received. These holding walls 76 face each other substantially in parallel across a predetermined space and have these facing surfaces formed as stepped surfaces having primary pressing surfaces 76a at the open end sides of the recess 74 (lower side in the figure) and secondary pressing surfaces 76b at the inside side of the recess 74 (upper side in the figure) (FIG. 7). Therefore, the recess 74 is formed with a relatively broad area defined by the two primary pressing surfaces 76a and a relatively narrow area defined by the two secondary pressing surfaces 76b.

The fiber securing member 66 sits with its butterfly joint 66a at the bottom surface 32a of the second recess 32 of the inner cylinder 22 and is housed in the second recess 32 in the state enabling an opening and closing operation. The actuating member 68 is designed to block the side opening of the second recess 32 of the inner cylinder 22 and the side opening of the second cavity 48 of the outer housing 24 and is received in the second recess 32 of the inner cylinder 22 in a movable manner. At this time, the actuating member 68 receives the two wings 70 of the fiber securing member 66 at the recess 74 and supports the two wings 70 by hugging them from the outsides step by step by the two holding walls 76 at the pressing surfaces 76a and 76b along with movement of the actuating member 68. Therefore, the actuating member 68 applies pressure from the two holding walls 76 to the two wings 70 of the fiber securing member 66 in the direction bringing them together and makes the fiber securing member 66 operate to displace from the open position to the closed position while moving from the temporary position (FIG. 1) to the finished position with respect to the inner cylinder 22 (and outer housing 24).

The cable holding member 20 of the optical connector 10 is provided with a rear portion 78 having a substantially block-like outer shape and a tubular front portion 80 running integrally from one side face of the rear portion 78. The rear portion 78 is formed with a receptive groove 82 for receiving the optical fiber cable for attachment with the optical cable 10, while the front portion 8 is provided with an attaching bore 84 communicated with the receptive groove 82 and receiving the rear portion 28 of the inner cylinder 22 of the body 12. The receptive groove 82 and the attaching bore 84 extend straight at positions substantially concentric with each other. Their center axes define the axis 20a of the cable holding member 20. Note that the cable holding member 20 can be formed integrally from a suitable plastic material by for example injection molding.

The rear portion 78 has at its outer surface a flat top surface 78a and bottom surface 78b extending in parallel to each other, a rear end face 78b substantially perpendicular to the top surface 78a and bottom surface 78b at the opposite side from the front portion 80, and a pair of side surfaces 78d substantially perpendicular to the top surface 78a, bottom surface 78b, and rear end face 78c. The substantially rectangular cross-section receptive groove 82 opens to both the top surface 78a and rear end face 78c. Further, the front portion 80 has a top surface 80a forming the same plane with the top surface of the rear portion 78, side surfaces 80b extending in a partially tubular manner from the top surface 80a to surround the attaching bore 84, and a front end face 80c substantially perpendicular to the top surface 80a and the side surfaces 80b at the opposite side from the rear portion 78. The substantially circular cross-section attaching bore 84 opens at the front end face 80c and opens at the top surface 80a through the slit 86.

The rear portion 78 of the cable holding member 20 is further provided with a plurality of engaging projections 88 projecting out at the inside surfaces of the pair of side walls defining the receptive groove 82. These engaging projections 88 extend in parallel to each other on the inside surfaces of the side walls in a direction substantially perpendicular to the top surface 78a of the rear portion. The individual engaging projections 88 project out from the inside surfaces of the side walls with substantially triangular cross-sections. Preferably, the angles of inclination of the inclined faces of the rear end face 78c sides with respect to the inside surfaces of the side walls are smaller than the angles of inclination of the inclined faces at the attaching bore 84 sides. The thus saw-tooth arrayed engaging projections 88 engage so as to bite into the sheath of the optical fiber cable received in the receptive groove 82 at their top areas and statically hold the optical fiber cable in the receptive groove 82. In particular, by forming the plurality of engaging projections 88 in saw-tooth shapes having the above orientations, the cable holding member 20 can strongly prevent an operation moving the optical fiber cable received in the receptive groove 82 toward the rear end face 78c more than an operation moving it toward the front end face 80c.

The cable holding member 20 is arranged at the rear end of the outer housing 24 in the axial direction with the attaching bore 84 of the front portion 80 communicated with the third cavity 50 of the outer housing 24. At this time, the rear portion 28 of the inner cylinder 22 of the body 12 is complementarily inserted into the attaching bore 84 of the front portion 80 of the cable holding member 20. Due to this, the cable holding member 20 is supported at the rear portion 28 of the inner cylinder 22 with its axis 20a matched with the center axis 22a of the inner cylinder 22 and is assembled with the body 12 to be able to move in the axial direction substantially parallel to the direction of extension of the incorporated optical fiber 16 as explained later.

Figure 10A:
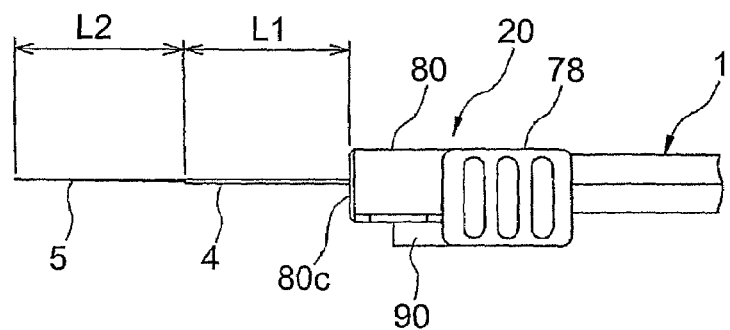
FIG. 10(a) is a front view and FIG. 10(b) is a perspective view of an optical fiber cable for which the terminating operation of FIG. 9 has been finished.
Figure 10B:
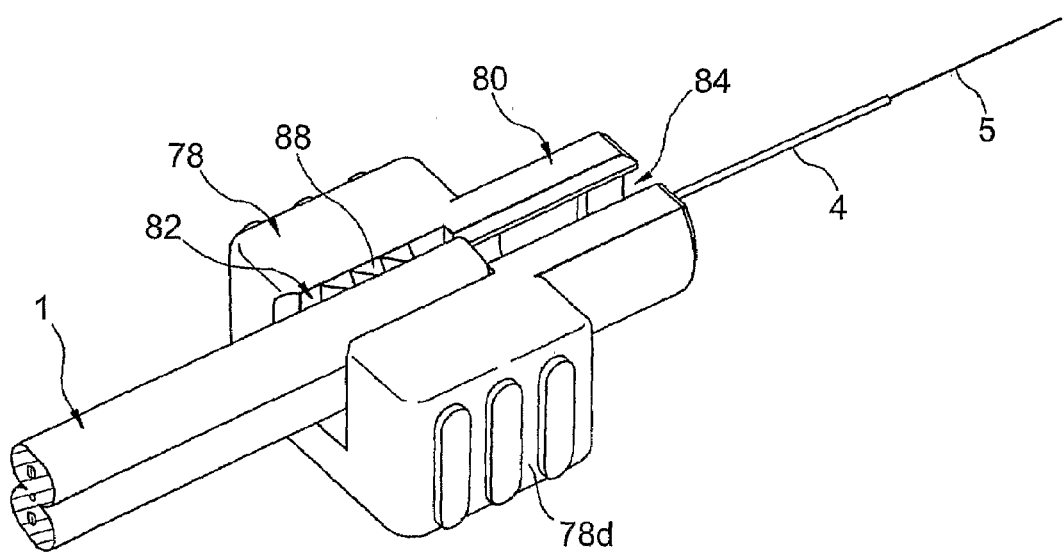
Figure 15A:
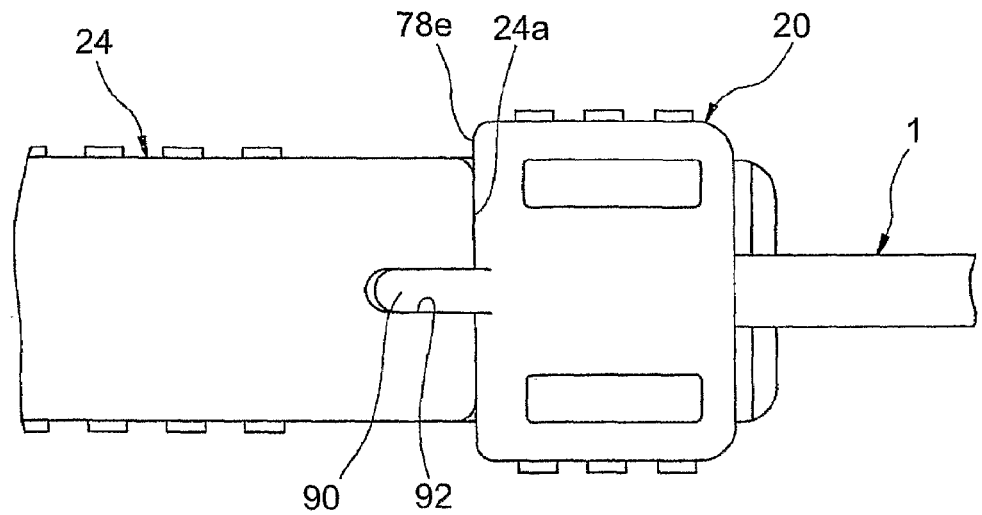
FIG. 15 shows bottom views of the body and the cable holding member, wherein (a) shows a temporary position and (b) shows a finished position.

The side surfaces 80b of the front portion 80 of the cable holding member 20 are provided with a projection 90 extending in the axial direction at a position adjoining the bottom surface 78b of the rear portion 78 at the opposite side to the slit 86 (FIG. 10). As opposed to this, the outside housing 24 of the body 12 is formed with a notch 92 locally opening the third cavity 50 at a position at the opposite side to the slit 58 at the rear end in the axial direction (FIG. 15). When correctly assembling the cable holding member 20 to the body 12, the former projection 90 is received in the notch 92 of the outer housing 24 slidably in the axial direction. Due to this, the cable holding member 20 is engaged positioned in the rotational direction about the axis 20a. Further, in this state, the opening of the receptive groove 82 of the cable holding member 20 and the slit 86 of the attaching bore 84 are arranged positioned at the slit 58 of the outer housing 24.

Figure 9:
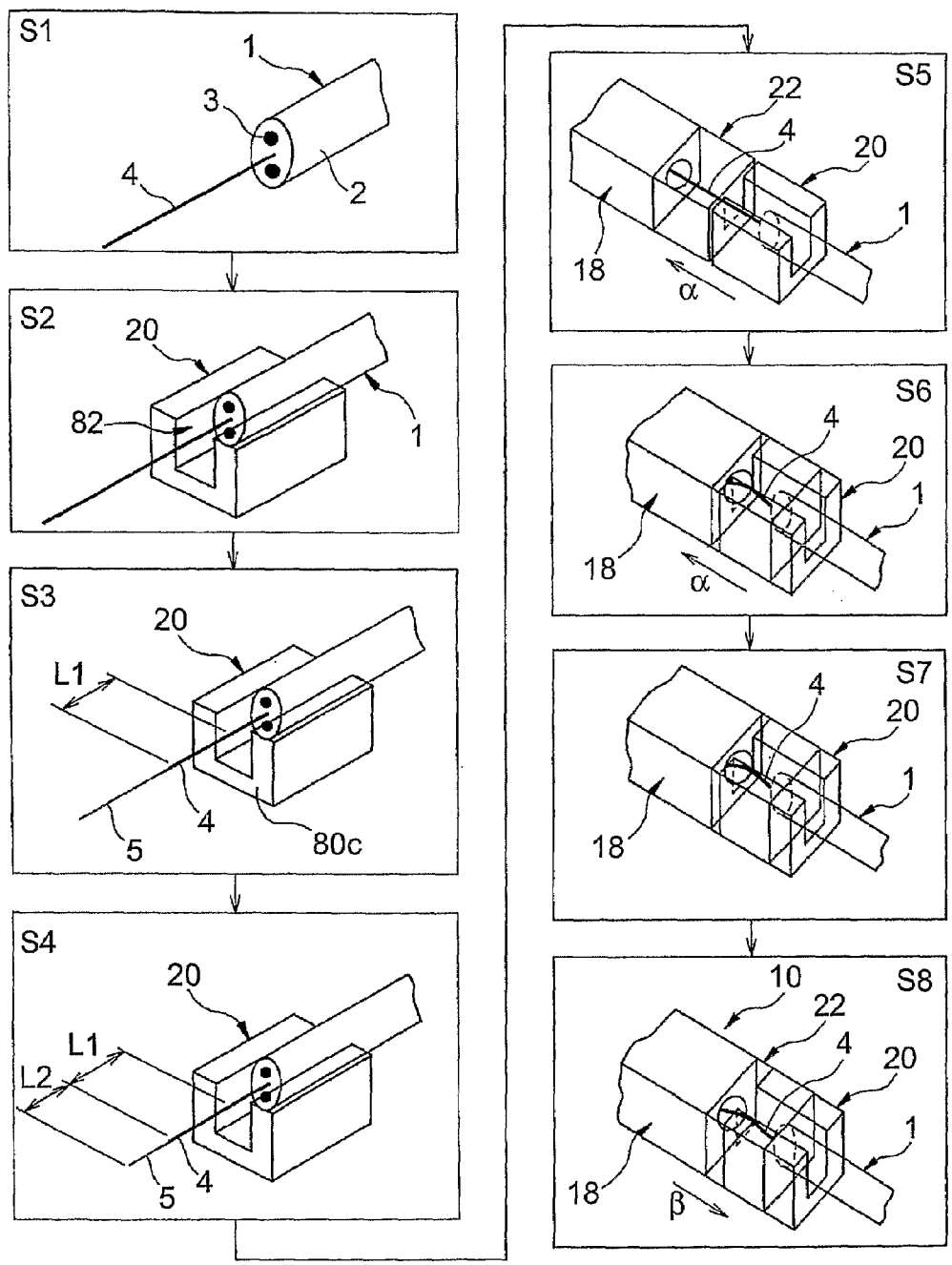
FIG. 9 is a flow chart showing schematically a cable terminating operation and splicing operation in the optical connector of FIG. 1.

In the state holding the optical fiber cable for attachment with the optical connector 10, the cable holding member 20 can be set at the temporary position making the optical fiber of the optical fiber cable abut against the incorporated optical fiber at the splicing section 18 and bending the covered optical fiber of the optical fiber cable under pressure in the lengthwise direction between the splicing section 18 and the cable holding member 20. Further, after the splicing section 18 securely supports the incorporated optical fiber 16 and the optical fiber of the optical fiber cable in an end-abutting condition, the cable holding member 20 can be set at the finished position releasing the pressing force in the lengthwise direction to the covered optical fiber of the optical fiber cable. This characterizing configuration will be explained with reference to the cable terminating operation and splicing operation shown schematically in FIG. 9.

First, as the cable terminating operation, the sheath 2 and the tension members 3 are stripped off of the desired length of the terminal end of the optical fiber cable 1 to be attached so as to expose the covered optical fiber 4 (step S1). Next, this optical fiber cable 1 is inserted into the receptive groove 82 of the cable holding member 20 of the optical connector 10 where it is statically held (step S2). In this state, the covering is stripped off the desired length of the front end of the covered optical fiber to expose the optical fiber 5 (step S3). At this time, the covering is left at the desired length L1 from the front end face 80c of the front portion 80 of the cable holding member 20 (FIG. 8) and the length of the covered optical fiber 4 is determined. Next, the exposed optical fiber 5 is sliced and cut by a special cutting tool at a location of the predetermined length L2 from the covering end (step S4). Due to this, the length of the optical fiber 5 is determined and the end face of the optical fiber 5 is formed. This cable terminating operation can be performed at the installation site of the optical transmission line. Further, the cable holding member 20 holding the terminated optical fiber cable 1 is shown in FIGS. 10(a) and (b).

Next, as the splicing operation, in the state with the fiber securing member 66 of the splicing section 18 of the optical connector 10 set to the open position, the cable holding member 20 holding the terminated optical fiber cable 1 is attached to the rear portion 28 of the inner cylinder 22 of the optical connector 10 as explained above and set at the rear end area of the outer housing 24 in the axial direction (FIG. 1). Along with this, the exposed covered optical fiber 4 and optical fiber 5 of the optical fiber cable 1 are arranged at the fiber introduction bore 38 of the rear portion 28 of the inner cylinder 22 (FIG. 1) and the cable holding member 20 is moved toward the inner cylinder 22 (arrow α), whereby they are inserted into the securing groove 72 of the fiber securing member 66 of the splicing section 18 (FIG. 1) (step S5). Note that at this time, the covered optical fiber 4 and the optical fiber 5 of the optical fiber cable 1 can be quickly arranged at the fiber introduction bore 38 through the slit 58 of the outer housing and the slit 42 of the inner cylinder (FIG. 1) arranged mating with each other.

Figure 11A:
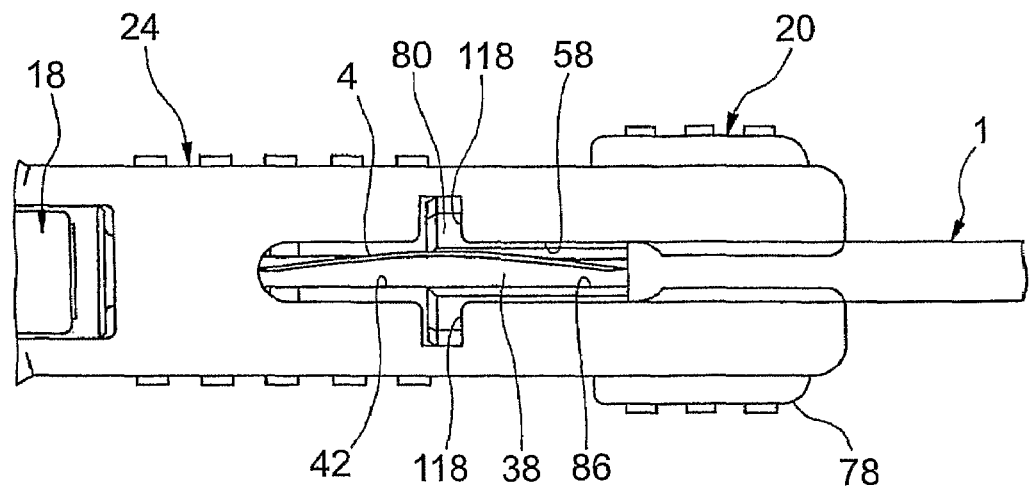
FIG. 11 shows views showing a temporary position of a cable holding member in the splicing operation of FIG. 9, wherein (a) is a plan view and (b) is a cross-sectional view.

Then, the cable holding member 20 is moved further toward the inner cylinder 22 to make the sliced end face of the optical fiber 5 of the optical fiber cable 1 abut against the rear end face 16c of the projecting portion 16d of the incorporated optical fiber 16 prearranged at the securing groove 72 of the fiber securing member 66 (FIG. 5) and bend the covered optical fiber 4 of the optical fiber cable 1 under pressure in the lengthwise direction between the splicing section 18 and the cable holding member 20 (step S6). Due to this, the cable holding member 20 is arranged at the temporary position. Here, as shown in FIGS. 11(a) and (b), when the cable holding member 20 is arranged at the temporary position, the covered optical fiber 4 of the optical fiber cable 1 bent between the splicing section 18 and the cable holding member 20 extends outward from the fiber introduction bore 38 of the rear portion 28 of the inner cylinder 22 through the slit 42. This state can be visually confirmed from outside of the optical connector 10 through the slit 58 of the outer housing 24 and the slit 86 of the cable holding member 20.

While the cable holding member 20 is at the temporary position, the projecting portion 16d of the incorporated optical fiber 16 and the optical fiber 5 of the optical fiber cable 1 in the securing groove 72 of the fiber securing member 66 of the splicing section 18 are made to accurately abut at their two end faces by the pressing force in the lengthwise direction applied to the covered optical fiber 4 of the optical fiber cable 1. Therefore, after visually confirming the bending of the covered optical fiber 4, as explained above, the actuating member 68 of the splicing section 18 (FIG. 1) is operated to make the fiber securing member 66 move to the closed position while leaving the cable holding member 20 at the temporary position. Due to this, the incorporated optical fiber 16 and the optical fiber 5 are securely supported at the splicing section 18 in the end-abutting condition with each other (step S7).

Figure 12:
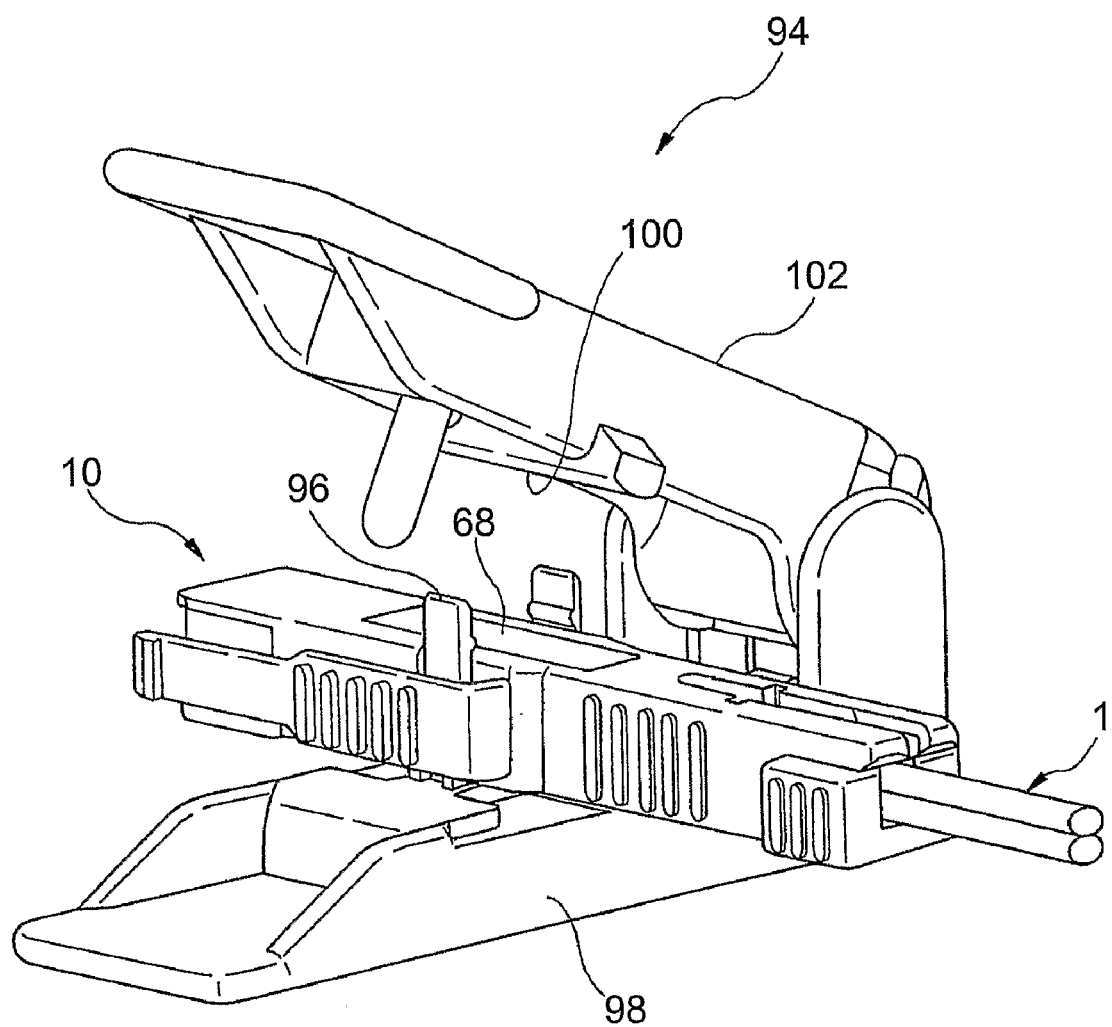
FIG. 12 is a perspective view of an assembly tool able to be used in the splicing operation of FIG. 9.

To operate the actuating member 68 of the splicing section 18, it is for example possible to use an assembly tool 94 such as shown in FIG. 12. The assembly tool 94 is provided with a base 98 having a connector mount 96 for mounting an optical connector 10 and an operating part 102 pivotally linked with the base 98 and having a pressing surface 100 for pressing the actuating member 68 of the optical connector 10. Such an assembly tool 94 eliminates the fiber holding part of the conventional assembly tool with the fiber holding part for holding the covered optical fiber of the optical fiber cable in a bent state, so is made remarkably smaller and simpler.

Figure 13A:
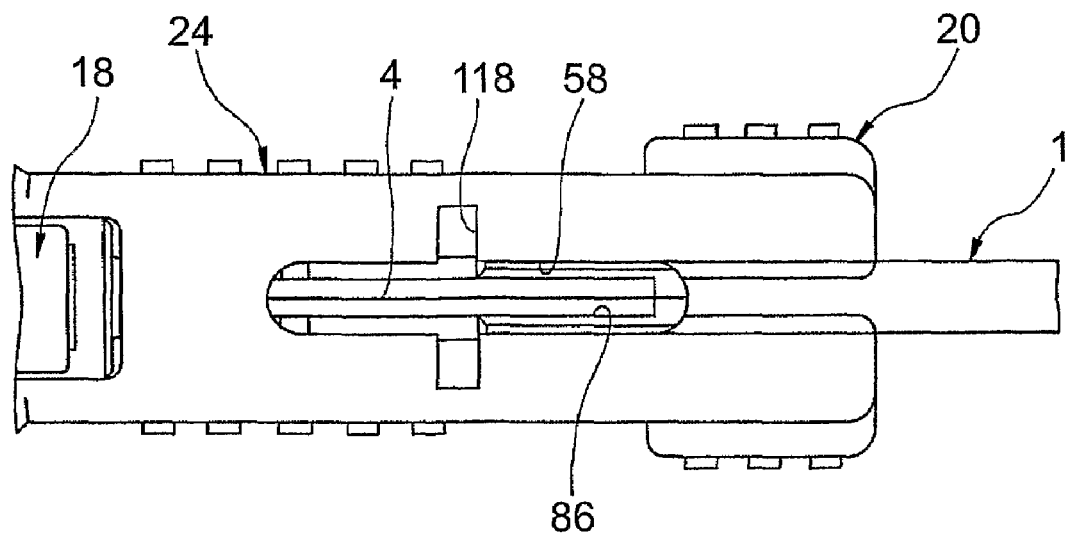
FIG. 13 shows views showing a finished position of a cable holding member in the splicing operation of FIG. 9, wherein (a) is a plan view and (b) is a cross-sectional view.
Figure 13B:
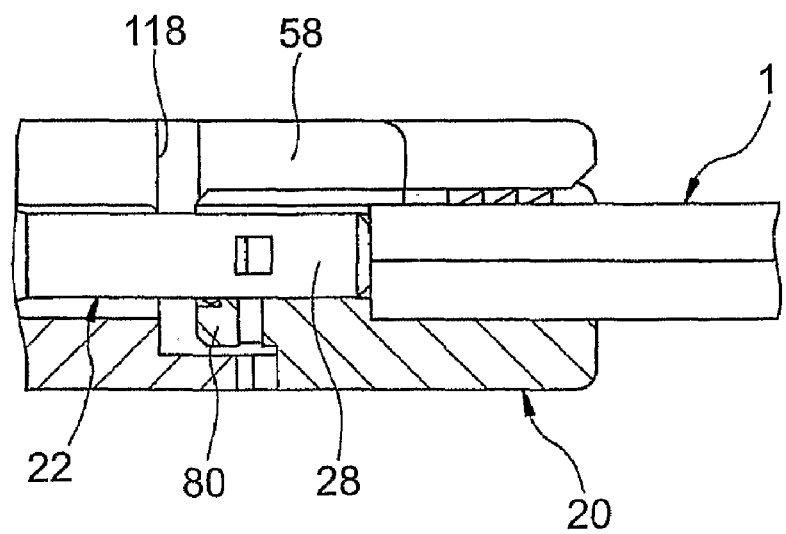

After the completion of the splicing operation, the cable holding member 20 is made to move in the direction away from the inner cylinder 22 (arrow β) so as to set it at the finished position where the pressing force in the lengthwise direction on the covered optical fiber 4 of the optical fiber cable 1 is substantially released (step S8). As shown in FIGS. 13(*a*) and (*b*), when setting the cable holding member 20 at the finished position, the covered optical fiber 4 of the optical fiber cable 1 returns to the substantially straight extended state between the splicing section 18 and the cable holding member 20. This state can be visually confirmed from outside of the optical connector 10 through the slit 58 of the outer housing 24 and the slit 86 of the cable holding member 20. In the state with the optical loss sufficiently reduced in this way, the optical connector 10 is attached to the optical fiber cable 1.

Note that as will be understood from the above flow, the length L2 of the optical fiber 5 of the optical fiber cable 1 determined at the cable terminating operation should be a length enabling the optical fiber 5 to be made to abut against the projecting portion 16*d* of the incorporated optical fiber 16 at their end faces in the securing groove 72 of the fiber securing member 66 of the splicing section 18 of the optical connector 10. Further, the length L1 of the covered optical fiber 4 should be a length enabling the bending of the covered optical fiber 4 to be visually confirmed between the splicing section 18 and the cable holding member 20 when setting the cable holding member 20 at the temporary position while enabling the covered optical fiber 4 to extend substantially straight between the splicing section 18 and the cable holding member 20 when setting the cable holding member 20 at the finished position.

In this way, in the optical connector 10 having the above configuration, at the time of the splicing operation of the optical fiber cable 1, by setting the cable holding member 20 at the temporary position, it is possible to maintain the covered optical fiber 4 of the optical fiber cable 1 in the state suitably bent under pressing force in the lengthwise direction inside the optical connector 10 (that is, between the splicing section 18 and the cable holding member 20). Further, by moving the fiber securing member 66 of the splicing section 18 in this state, it is possible to connect the incorporated optical fiber 16 and the optical fiber 5 of the optical fiber cable 1 in the state with their two end faces accurately abutting against each other. Therefore, there is no longer any need for using the conventional assembly tool having a fiber holding part and as a result the work efficiency of the splicing operation at the installation site of an optical transmission line is remarkably improved. Further, it is possible to bend the covered optical fiber 4 without directly touching the covered optical fiber 4 by just moving the cable holding member 20 to the temporary position, so the danger of more than the necessary tension being applied to the covered optical fiber 4 or the position of the optical fiber 5 inserted into the splicing section 18 deviating is eliminated. Therefore, according to the optical connector 10, the splicing operation of the optical fiber cable 1 can be performed accurately and stably without requiring skilled labor and a superior on-site installation property can be realized.

Further, with the optical connector 10, after finishing the splicing operation at the splicing section 18, the cable holding member 20 is moved to the finished position to substantially release the pressing force in the lengthwise direction applied to the covered optical fiber 4 of the optical fiber cable 1. Therefore, it is possible to sufficiently reduce the optical loss at the portion of the covered optical fiber 4 of the optical fiber cable 1 and possible to increase the lifetime at the portion of the covered optical fiber 4. Further, with the optical connector 10, since a one-piece cable holding member 20 is arranged at the cable holding part for holding the optical fiber cable 1 and the sheath 2 of the optical fiber cable 1 is inserted into the receptive groove 82, it is possible to reduce the number of parts and number of assembly steps compared with the prior art such as tightening a metal fitting.

Figure 3B:
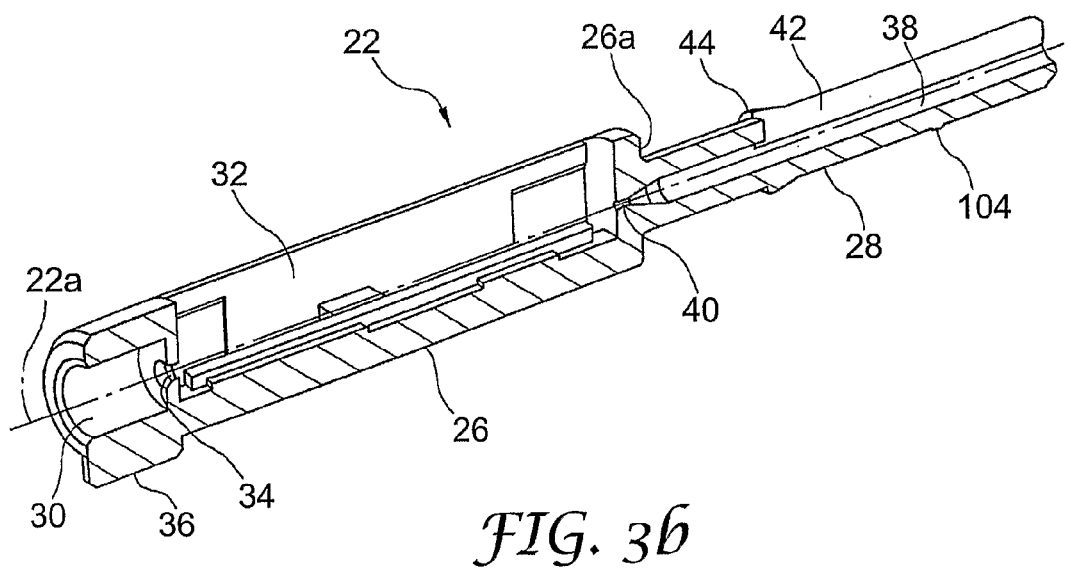

In the optical connector 10, it is advantageous to provide the body 12 with an anchoring structure for temporarily anchoring the cable holding member 20 at the temporary position. Such an anchoring structure, as shown in FIG. 14, may be comprised of a stopper 104 locally projecting out from the outside surface of the rear portion 28 of the inner cylinder 22 (FIG. 14(*a*)) and a counter recess locally sunk into the attaching bore 84 of the front portion 80 of the cable holding member 20 and able to engage with the stopper 104 (FIG. 14(*b*)). In the illustrated embodiment, the stopper 104 is formed at a position a predetermined distance from the rear end of the rear portion 28 in the axial direction at the opposite side to the slit 42 provided at the rear portion 28 of the inner cylinder 22 (FIG. 3). Further, the counter recess 106 is formed at a position a predetermined distance from the front end of the front portion 80 in the axial direction at the opposite side to the slit 86 provided at the front portion 80 of the cable holding member 20.

Figure 11B:
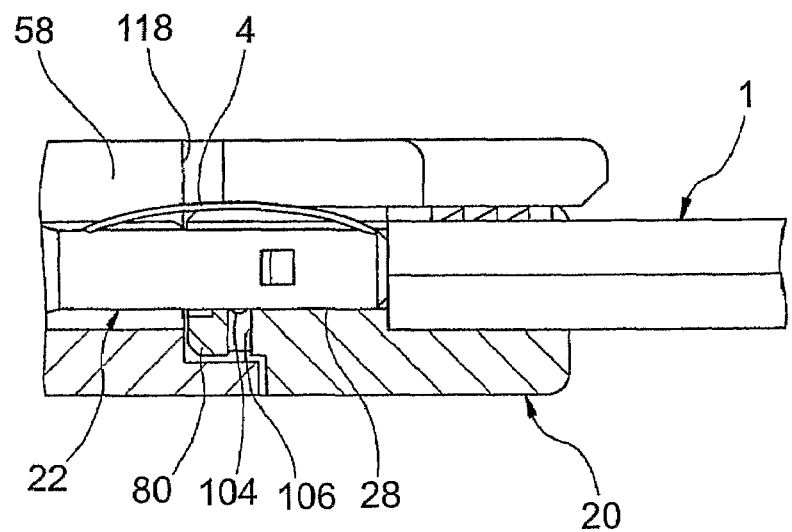

In the above anchoring structure, by the stopper 104 of the rear portion 28 of the inner cylinder 22 being inserted into the counter recess 106 of the front portion 80 of the cable holding member 20 in the state with the cable holding member 20 attached to the inner cylinder 22, the cable holding member 20 is stopped at the temporary position (FIG. 11). Therefore, in the above-mentioned splicing operation, after arranging the cable holding member 20 at the temporary position once, even if letting go of the cable holding member 20, the covered optical fiber 4 can be reliably maintained in the suitably bent condition, so the work of moving the actuating member 68 of the splicing section 18 becomes much easier.

Figure 15B:
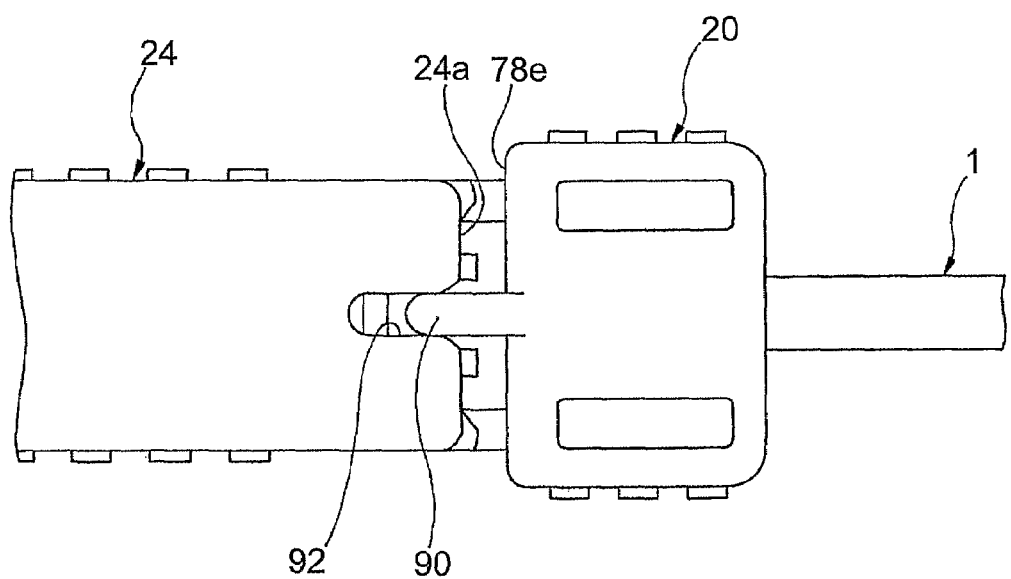

Note that the anchoring function of the anchoring structure at the temporary position is a temporary one until setting the cable holding member 20 at the finished position, so it is preferable to make the stopper 104 a structure of a small dimension having an outer surface extending in an arc toward the axial direction as illustrated for the purpose of facilitating attachment of the cable holding member 20 to the inner cylinder 22 and movement in the front and rear directions. However, when the cable holding member 20 moves past the temporary position in the direction approaching the inner cylinder 22, there is the danger of the covered optical fiber 4 of the optical fiber cable 1 being bent more than necessary and in some cases being damaged. Such excessive bending of the covered optical fiber 4 is prevented as shown in FIG. 15 by making the outer surface of the rear portion 78 of the cable holding member 20 strike the rear end face of the outer housing 24 in the axial direction. Specifically, when the cable holding member 20 is at the temporary position (FIG. 15(*a*)), the shoulder 78*e* formed between the rear portion 78 and front portion 80 of the cable holding member 20 abuts against the rear end face 24a of the outer housing 24 in the axial direction. When the cable holding member 20 is at the finished position (FIG. 15(b)), the shoulder 78e of the cable holding member 20 moves away from the rear end 24a of the outer housing 24 in the axial direction by exactly a predetermined distance.

Figure 14A:
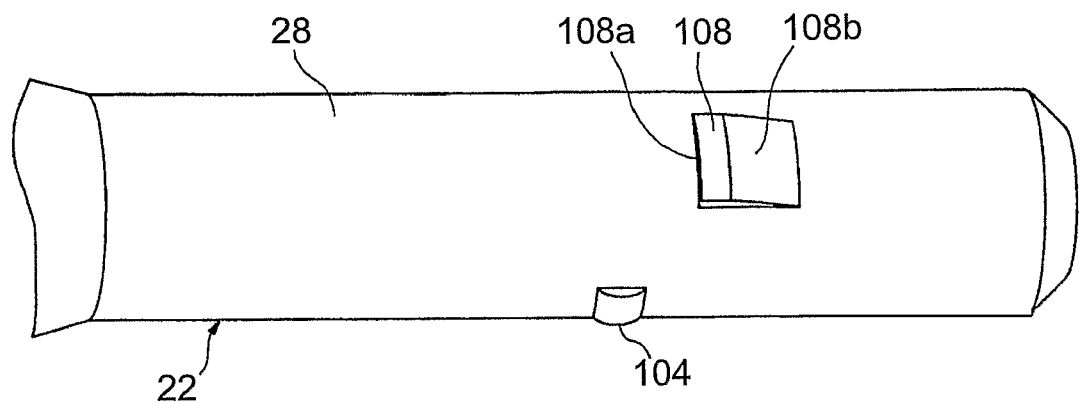
FIG. 14 shows views showing a stop mechanism of the cable holding member, wherein (a) is a partially enlarged view of an inner cylinder and (b) is an enlarged cross-sectional view of a cable holding member.
Figure 14B:
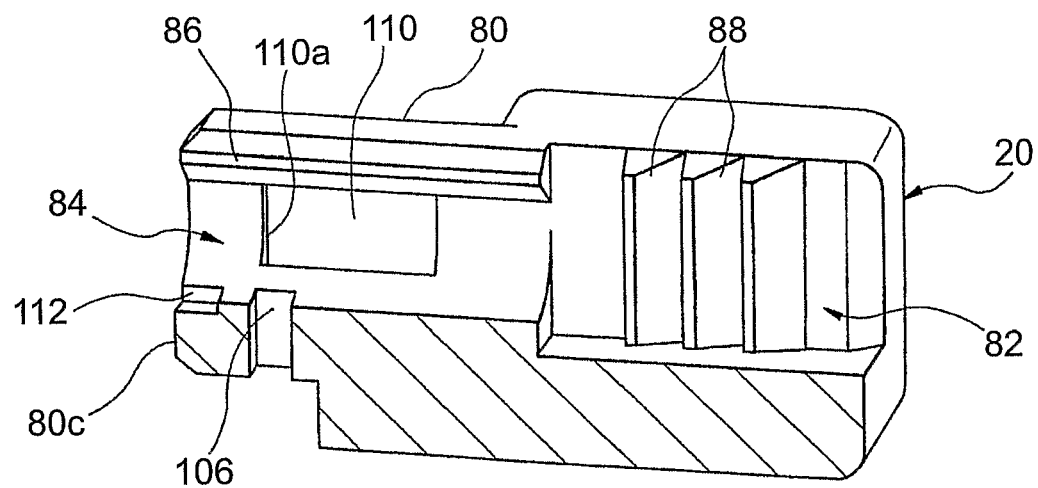

At the optical connector 10, it is further advantageous to provide the body 12 with an anchoring structure for anchoring the cable holding member 20 at the finished position. This anchoring structure, as shown in FIG. 14, can be comprised by second stoppers 108 locally projecting out separate from the stopper 104 at the outer surface of the rear portion 28 of the inner cylinder 22 (FIG. 14(a)) and second counter recesses 110 locally sunken separate from the counter recess 106 in the attaching bore 84 of the front portion 80 of the cable holding member 20 and able to engage with the second stoppers 108 (FIG. 14(b)). In the illustrated embodiment, the second stoppers 108 are formed at the two sides in the lateral direction from the slit 42 of the rear portion 28 of the inner cylinder 22 (FIG. 3) at positions closer to the rear end of the rear portion 28 in the axial direction than the stopper 104. Further, the second counter recesses 110 are formed at the two sides in the lateral direction from the slit 86 of the front portion 80 of the cable holding member 20 extending up to positions farther from the front portion 80 in the axial direction from the counter recess 106.

In the above anchoring structure, in the state with the cable holding member 20 attached to the inner cylinder 22, the pair of second stoppers 108 of the rear portion 28 of the inner cylinder 22 are received in the pair of second counter recesses 110 of the front portion 80 of the cable holding member 20 and the cable holding member 20 is able to move between the temporary position and the finished position. Further, when the cable holding member 20 is moved from the temporary position toward the finished position, the shoulders 108a of the front ends of the second stoppers 108 in the axial direction abut against the shoulders 110a of the front ends of the corresponding second counter recesses 110 in the axial direction, whereby the cable holding member 20 is stopped at the finished position. Therefore, after the above-mentioned splicing operation is completed and the cable holding member 20 is set to the finished position, even if tension or other external force is applied to the optical fiber cable 1, the cable holding member 20 is mechanically stopped stably at the finished position, so the danger of unintentional tension being applied to the covered optical fiber 4 is eliminated.

Note that the anchoring function of the anchoring structure at the finished position is required to strongly prevent the cable holding member 20 from moving further to the rear from the finished position in the axial direction, so the shoulders 108a of the second stoppers 108 preferably extend at right angles or acute angles with respect to the outer circumference of the rear portion 28 of the inner cylinder 22 or the shoulders 110a of the second counter recesses 110 extend similarly with respect to the inner circumference of the attaching bore 84 of the cable holding member 20. On the other, to facilitate attachment of the cable holding member 20 to the inner cylinder 22, the second stoppers 108 are preferably provided with gently slanted surfaces 108b at the opposite sides to the shoulders 108a. Further, when the cable holding member 20 is at the finished position, to prevent the cable holding member 20 from unintentionally moving toward the temporary position, it is also possible to provide a complementary counter recess 112 able to receive the stopper 104 of the inner cylinder 22 adjoining the front end face 80c in the attaching bore 84 of the cable holding member 20 (FIG. 14(b)).

Each of the anchoring structures of the cable holding member 20 provided for the temporary position and the finished position as described above is configured from a set of mutually engagable projection and depression formed respectively at predetermined locations on the inner cylinder 22 of the body 12 and the cable holding member 20. Therefore, in order to properly perform the bending and releasing of the covered optical fiber 4 of the optical fiber cable 1, it is necessary to process the cable terminating operation by setting the length L1 of the covered optical fiber 4 and the length L2 of the optical fiber 5 (FIG. 10(a)) in such a manner that they accurately correspond to the locations of the anchoring structures. To the contrary, it is also possible to provide an anchoring structure to the optical connector, which does not require such an accurate cable terminating operation.

Figure 16:
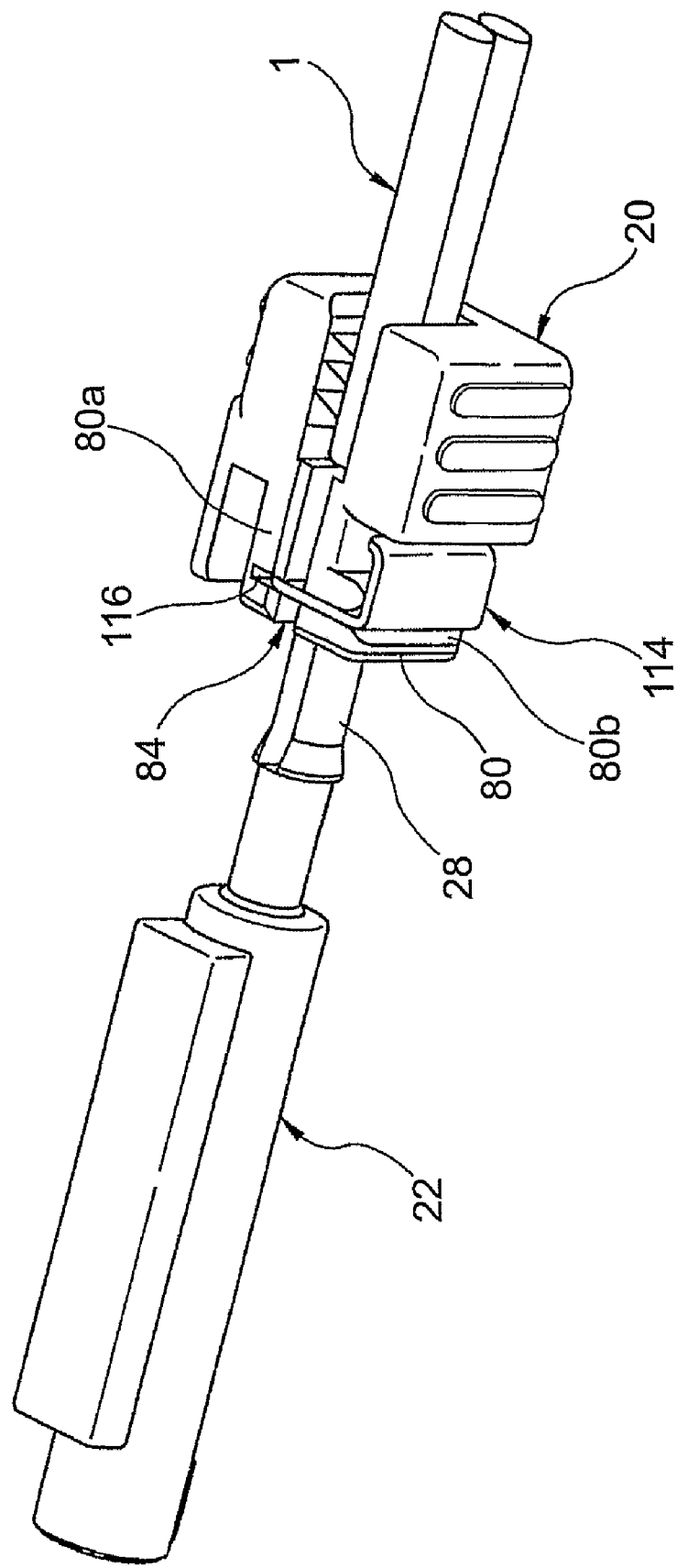
FIG. 16 is a perspective view of an inner cylinder and a cable holding member, showing a modified anchoring structure.
Figure 17A:
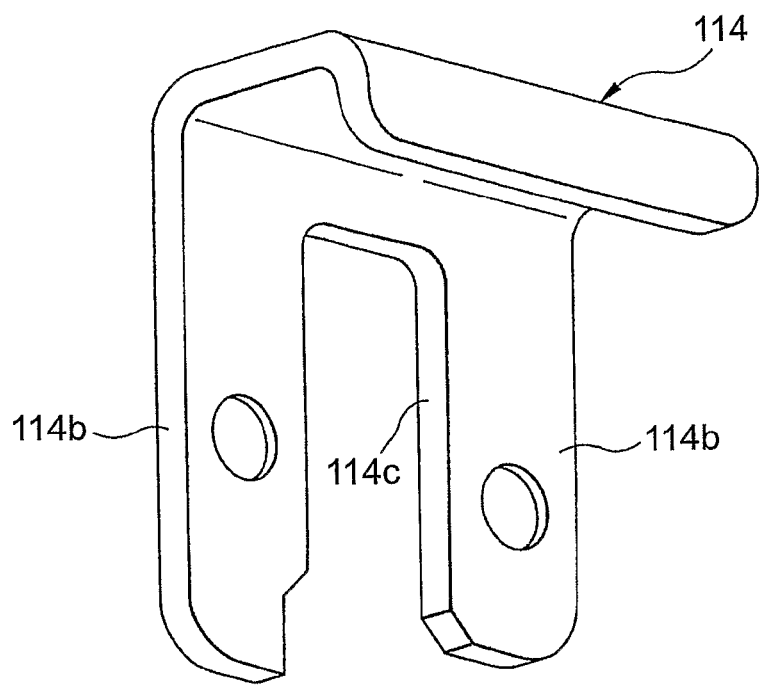
FIG. 17 shows views showing an anchoring member constituting the anchoring structure of FIG. 16, wherein (a) is a perspective view in one direction, and (b) is a perspective view in another direction.
Figure 18:
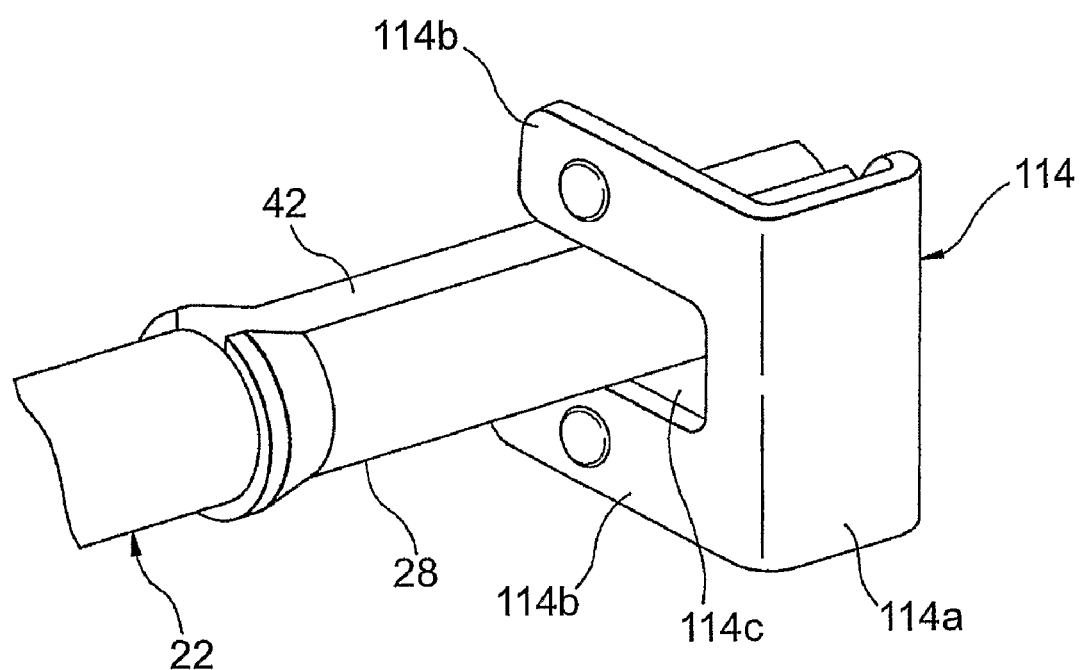
FIG. 18 is a view showing the anchoring member of FIG. 17 in an operative position.

Such a modified anchoring structure may be configured from an anchoring member 114, as shown in FIG. 16, for securely anchoring the cable holding member 20 at the finished position in relation to the inner cylinder 22 of the body 12. The anchoring member 114 is a rigid thin-plate element made by, e.g., stamping and bending a metal plate material, and includes a ridge portion 114a and a pair of blade portions 114b spaced in parallel from each other and extending perpendicularly from one edge of the ridge portion 114a (FIG. 17(a),(b)). The blade portions 114b of the anchoring member 114 define a gap 114c therebetween for receiving the rear portion 28 of the inner cylinder 22. The gap 114c is dimensioned so that, upon receiving the rear portion 28 of the inner cylinder 22, the blade portions 114b partially cut at the opposing edges thereof into the material of the rear portion 28 (FIG. 18).

Figure 17B:
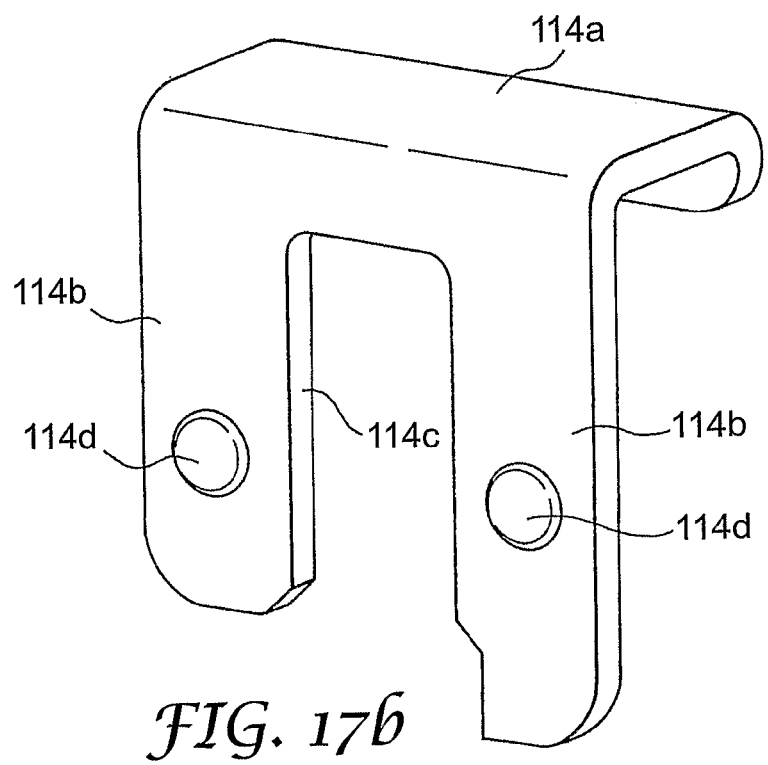

On the other hand, the cable holding member 20 is provided in the front portion 80 thereof with a slot 116 partially opening over the top surface 80a and the side surface 80b and extending across the attaching bore 84 (FIG. 16). The anchoring member 114 is supported on the cable holding member 20 in a condition where the blade portions 114b are received in the slot 116 of the cable holding member 20, so as to be displaceable between an operative position (FIG. 18) where the blade portions 114b partially cut into the rear portion 28 of the inner cylinder 22 located in the attaching bore 84 and an inoperative position where the blade portions 114b are not engaged with the rear portion 28 of the inner cylinder 22. In this respect, each blade portion 114b of the anchoring member 114 may be provided with a protuberance 114d for ensuring a contact pressure inside the slot 116 of the cable holding member 20 to the purpose of preventing the detachment of the anchoring member 114 (FIG. 17(b)). It should be noted that the stopper 104, the counter recess 106, the second stopper 108, the second counter recess 110 and the complementary recess 112 are omitted in this modification.

Figure 19A:
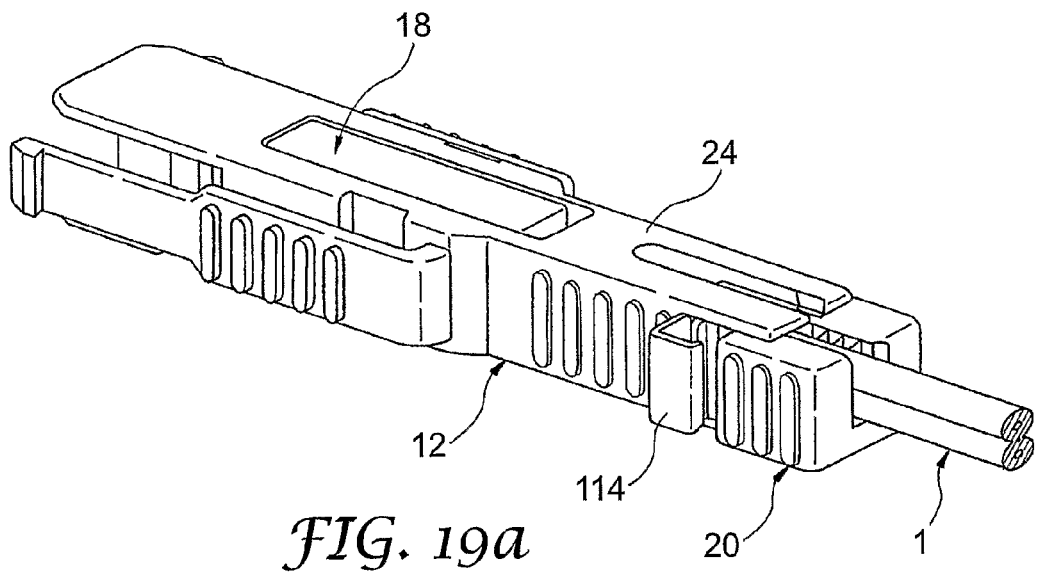
FIG. 19 shows views showing the optical connector having the anchoring structure of FIG. 16 at the finished position, wherein (a) is a condition where the anchoring member is in an inoperative position, and (b) is a condition where the anchoring member is in an operative position.
Figure 19B:
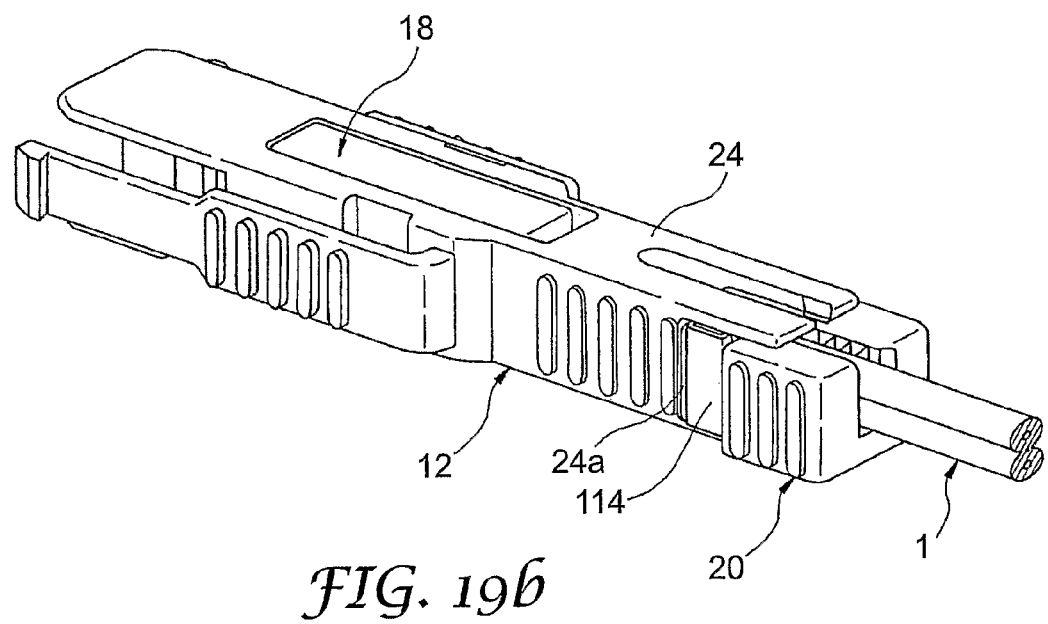
Figure 20:
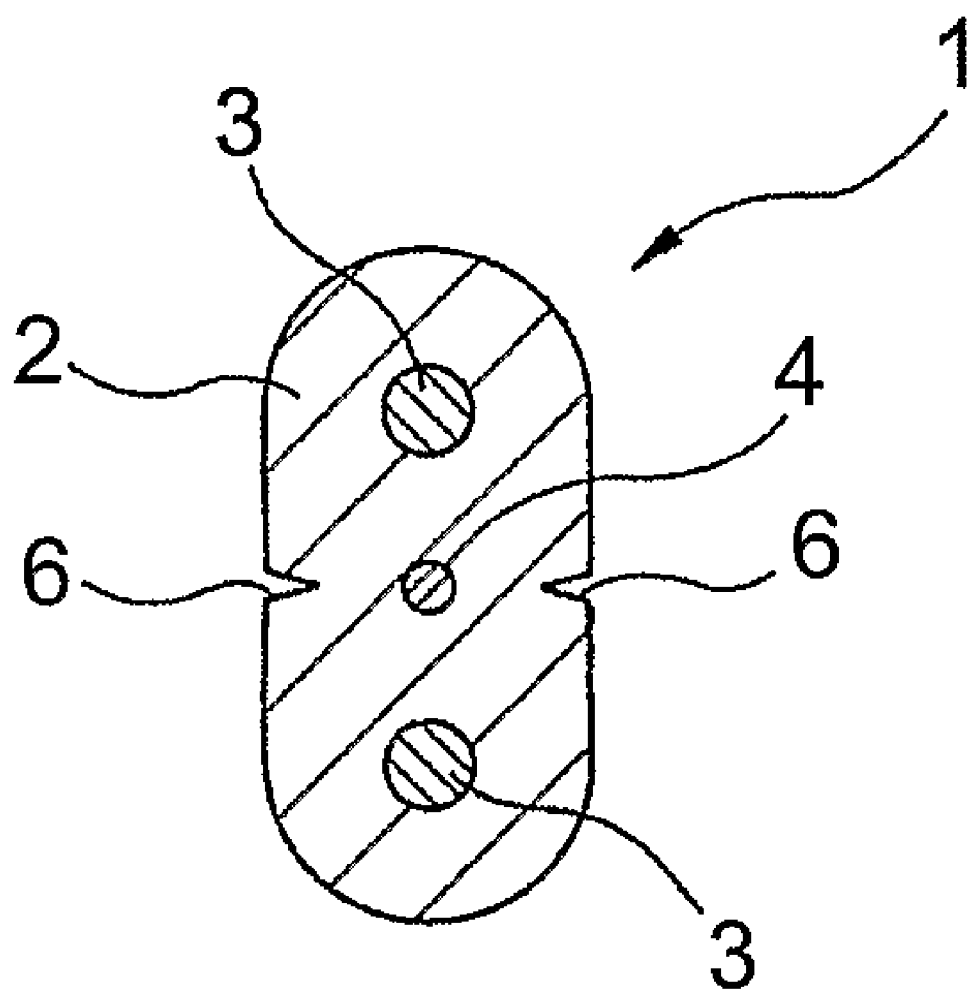
FIG. 20 is a cross-sectional view of a drop optical cable.

In the above modified anchoring structure, it is possible to move the cable holding member 20 attached to the inner cylinder 22 between the temporary position and the finished position, in the condition where the anchoring member 114 is disposed at the inoperative position. When the cable holding member 20 is in the temporary position, the anchoring member 114 is left at the inoperative position and the cable holding member 20 is held by, e.g., an operator's hand to maintain the covered optical fiber 4 in a suitable bent condition as already described (FIG. 11). After the splicing operation is completed in the splicing section 18, the cable holding member 20 is shifted from the temporary position toward the finished position, and the anchoring member 114 is displaced from the inoperative position (FIG. 19(a)) to the operative position (FIG. 19(b)) at the time when the covered optical fiber extends straightly. Consequently, the blade portions 114b of the anchoring member 114 partially cut into the rear portion 28 of the inner cylinder 22 and the cable holding member 20 is anchored at the finished position. In this modification, the outer housing 24 of the body 12 is partially cut-off at a region near the axial rear-end face 24a, so as to avoid the collision between the outer housing 24 and the anchoring member 114 (FIG. 19(b)).

In the optical connector 10, further, the body 12 advantageously has an indicator showing that the cable holding member 20 is at the temporary position in a visually confirmable manner from the outside of the body 12. Such an indicator is comprised, in the illustrated embodiment, of a pair of windows 118 sunken in the two sides perpendicular to the slit 58 of the rear end of the outer housing 24 in the axial direction (FIG. 14). These windows 118 have arrangements and dimensions so as to enable the front end area of the front portion 80 of the cable holding member 20 in the axial direction to be partially seen from the outside of the optical connector 10 through the windows 118 (FIG. 13) when the cable holding member 20 is at the temporary position (FIG. 11) and not enable the front portion 80 of the cable holding member 20 to be seen from the outside of the optical connector 10 through the windows 118 when the cable holding member 20 is at the finished position (FIG. 13).

Therefore, even when it is difficult to visually confirm the bent state of the covered optical fiber 4 through the slit 58 of the outer housing 24, a worker can judge if the cable holding member 20 is at the temporary position or the finished position by whether the front portion 80 of the cable holding member 20 can be visually confirmed through the windows 118. Note that to further facilitate this judgment, it is advantageous to make the color of the outer housing 24 and the color of the cable holding member 20 different.

The optical connector 10 having this configuration can be suitably applied to an aerial access drop optical cable as the optical fiber cable 1 to be attached. As shown in FIG. 16, the drop optical cable 1 has a pair of channels 6 extending in the lengthwise direction at opposite positions on the outer surface of a plastic sheath 2 and is comprised of a covered optical fiber 4 arranged at a predetermined position (normally at the center position of the cable) with respect to the pair of grooves 6 and a pair of tension members (for example, steel wires, FRP (fiber reinforced plastic) cords, etc.) 3 arranged at the two sides of the covered optical fiber 4, which are housed in the sheath 2 with substantially no clearance therebetween.

In order to attach the optical connector 10 is attached to the drop optical cable 1 as illustrated, the sheath 2 is torn in a lengthwise direction along the channels 6 on the outer surface of the sheath to expose the covered optical fiber 4, the distal end of the optical fiber 5 is processed, and thereafter the splicing operation is performed in the predetermined procedure as described above, in the condition where the drop optical cable 1 is directly held by the cable holding member 20 together with the sheath 2 thereof. In the splicing operation, it is possible to suitably bend the covered optical fiber 4 of the drop optical cable 1 inside the optical connector 10 as already described, and thus it is possible to connect the incorporated optical fiber 16 of the optical connector 10 with the optical fiber 5 of the drop optical cable 1 (FIG. 10) in the condition where the end faces thereof are accurately abutted to each other.

Figure 21A:
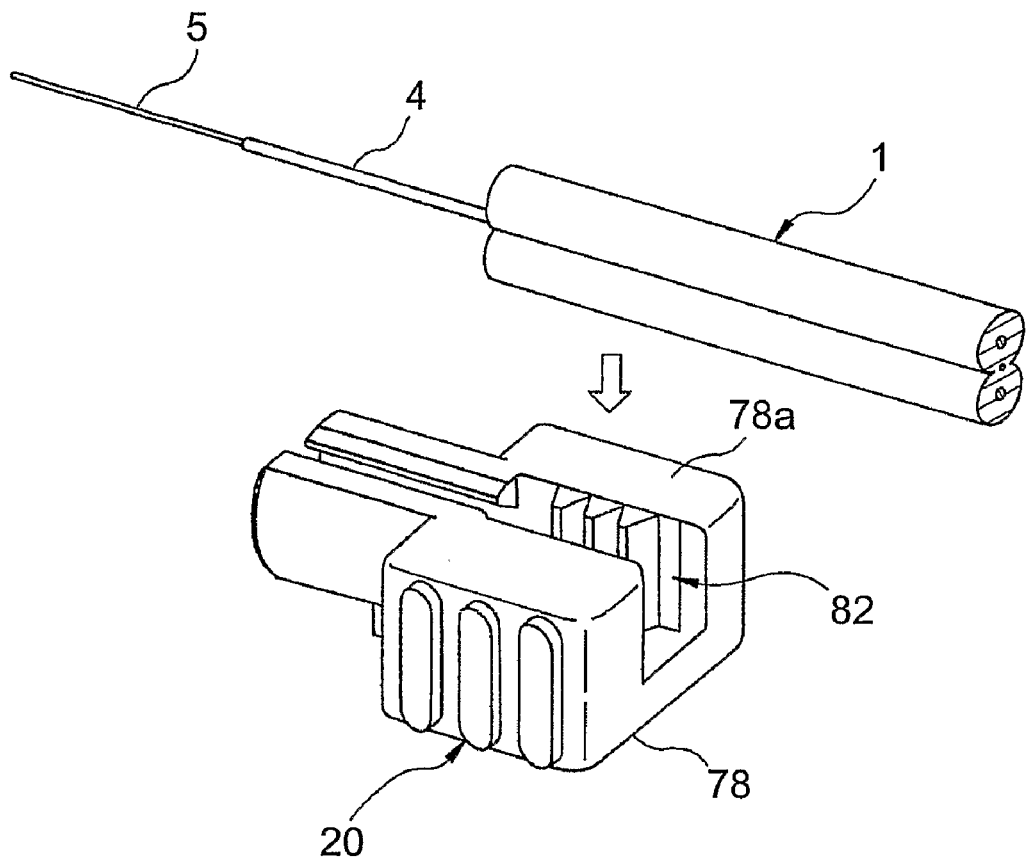
FIG. 21 shows views showing a plug-in direction of a drop optical cable in a cable holding member, wherein (a) shows a vertical direction and (b) shows a horizontal direction.
Figure 21B:
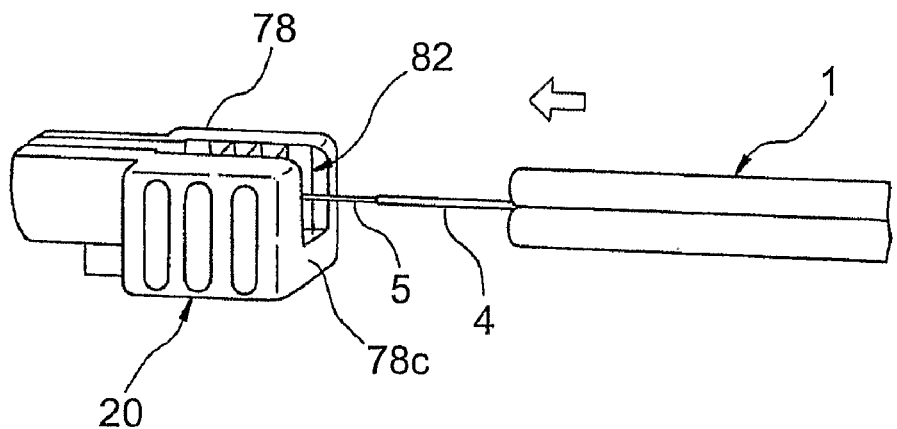

It should be noted that, when performing the above cable terminating operation on the above drop optical cable 1, the drop optical cable 1, as shown in FIG. 21, is attached to the cable holding member 20 by inserting it into the receptive groove 82 of the cable holding member 20 in a lateral direction from the top surface 78a of the rear portion 78 (FIG. 21(a)) or inserting it in a lengthwise direction from the rear end face 78c of the rear portion 78 (FIG. 21(b)).

Figure 22:
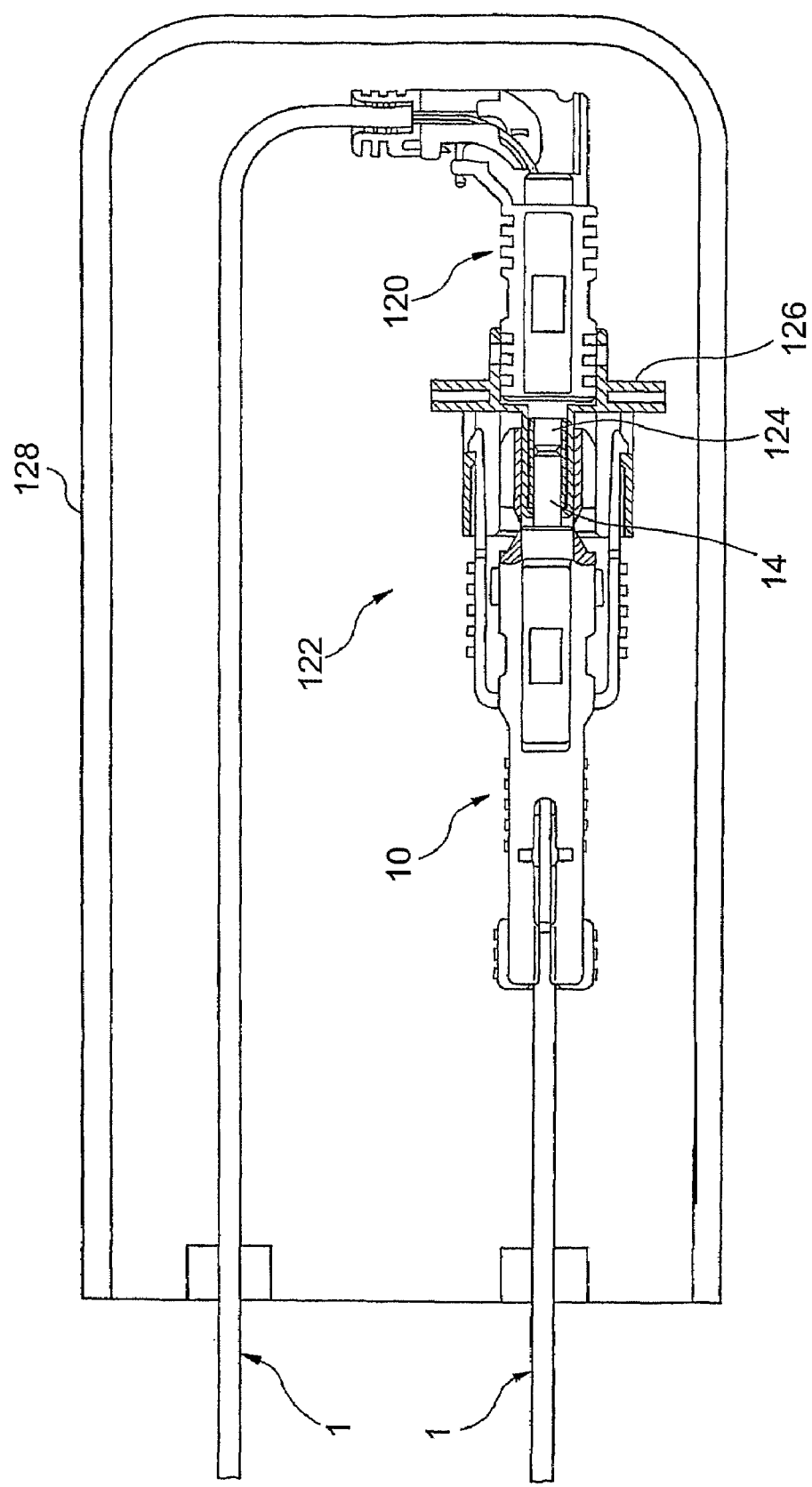
FIG. 22 is a plan view of an optical fiber connecting system according to an embodiment of the present invention.

The above optical connector 10 forms an optical fiber connecting system 122 when combined detachably with for example an angle type optical connector 120, as shown in FIG. 22. The counterpart optical connector 120 has a second ferrule 124 abutting concentrically against the ferrule 14 of the optical connector 10. When connecting the optical connector 10 and the optical connector 120, it is possible to use a well known split sleeve in an adapter 126 as separately provided, to make the abutting end faces of the ferrules 14, 124 of the connectors 10, 120 abut each other under the biasing force of for example the compression coil spring 56 (FIG. 1) and connect the pair of optical fibers in an end-abutting condition centered with a high precision. The optical fiber connecting system 122 having this configuration can be preferably applied to an optical transmission line laid in particular indoors due to the actions and effect of the optical connector 10. FIG. 22 shows as an example a cabinet 128 used in indoor wiring.

Above, preferred embodiments of the present invention were explained with reference to the figures, but the present invention is not limited to the illustrated configurations and can be modified in various ways within the description of the claims. For example, the configuration of the cable holding member of the optical connector according to the present invention can also be applied to an optical connector having a splicing section comprised of a pair of plates elastically held in close contact with each other which are pried apart to sandwich an optical fiber instead of the splicing section 18 of the illustrated embodiment. Further, the shapes and number of the engaging projections provided at the cable holding member may be modified in various ways to match the configuration of the optical fiber cables to be attached.

EXPLANATION OF REFERENCE NUMERALS

10 . . . optical connector
12 . . . body
14 . . . ferrule
16 . . . incorporated optical fiber
18 . . . splicing section
20 . . . cable holding member
22 . . . inner cylinder
24 . . . outer housing
66 . . . fiber securing member
68 . . . actuating member
82 . . . receptive groove
84 . . . attaching bore
88 . . . engaging projection
104 . . . stopper
106 . . . counter recess
108 . . . second stopper
110 . . . second counter recess
114 . . . anchoring member
116 . . . slot
118 . . . window
122 . . . optical fiber connecting system

We claim:

1. An optical connector, comprising a body; a ferrule provided in said body; an incorporated optical fiber with a predetermined length, securely supported on said ferrule; and a splicing section provided in said body near said ferrule and able to operate so as to securely support said incorporated optical fiber projecting out from said ferrule and an optical fiber of an optical fiber cable introduced from outside of said body in an end-abutting condition, characterized in that:

said optical connector further comprises a cable holding member provided in said body at a location opposite to said ferrule with said splicing section disposed therebetween, said cable holding member being able to hold an optical fiber cable; and in that said cable holding member is movable with respect to said body in a direction substantially parallel to an extending direction of said incorporated optical fiber; said cable holding member being able to be set, in the state holding the optical fiber cable, at a temporary position where said cable holding member makes the optical fiber of the optical fiber cable abut against said incorporated optical fiber in said splicing section and bends a covered optical fiber of the optical fiber cable between said splicing section and said cable holding member by a lengthwise pressing force, wherein said cable holding member is able to be set at a finished position where, after said splicing section securely supports said incorporated optical fiber and said optical fiber of said optical fiber cable in said end-abutting condition, said lengthwise pressing force applied to said covered optical fiber of said optical fiber cable is substantially released.

2. An optical connector as set forth in claim 1, further comprising an anchoring structure for temporarily anchoring said cable holding member at said temporary position on said body.

3. An optical connector as set forth in claim 1, further comprising an anchoring structure for anchoring said cable holding member at said finished position on said body.

4. An optical connector as set forth in claim 1, wherein said body includes an indicator showing a fact that said cable holding member is located at said temporary position in a manner visually confirmable from outside of said body.

5. An optical connector as set forth in claim 1, wherein said cable holding member is provided with a receptive groove for receiving the optical fiber cable and an engaging projection for engaging with a sheath of said optical fiber cable in said receptive groove and statically holding said optical fiber cable in said receptive groove.

6. An optical fiber connecting system, comprising a first optical connector as set forth in claim 1 and a second optical connector having a second ferrule to be concentrically abutted against said ferrule of said first optical connector; said first and second optical connectors being detachably combined with each other.

* * * * *